United States Patent
Serra et al.

(10) Patent No.: US 8,222,784 B2
(45) Date of Patent: Jul. 17, 2012

(54) ELECTRIC MACHINE WITH SINGLE STATOR AND TWO MUTUALLY INDEPENDENT ROTORS, AND ROAD VEHICLE PROVIDED WITH SAID ELECTRIC MACHINE

(75) Inventors: Giovanni Serra, San Giovanni in Persiceto (IT); Angelo Tani, Faenza (IT); Luca Zarri, Bologna (IT); Marco Raimondi, Piumazzo (IT); Marco Greco, San Giovanni in Persiceto (IT); Paolo Cominetti, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 354 days.

(21) Appl. No.: 12/704,164

(22) Filed: Feb. 11, 2010

(65) Prior Publication Data

US 2011/0031838 A1   Feb. 10, 2011

(30) Foreign Application Priority Data

Feb. 13, 2009   (IT) .............................. BO2009A0075

(51) Int. Cl.
*H02K 16/00* (2006.01)
*H02K 16/02* (2006.01)

(52) U.S. Cl. ....... 310/114; 310/68 R; 310/180; 310/198; 318/433; 318/495; 318/496; 318/629

(58) Field of Classification Search ............... 310/68 R, 310/114, 180, 198; 318/433, 495, 496, 629; H02K 16/00, 16/02
See application file for complete search history.

(56) References Cited

U.S. PATENT DOCUMENTS

| | | | | |
|---|---|---|---|---|
| 3,780,324 A * | 12/1973 | Greenwell | ..................... | 310/180 |
| 4,868,438 A * | 9/1989 | Okamoto et al. | ............. | 310/166 |
| 6,049,152 A * | 4/2000 | Nakano | .......................... | 310/114 |
| 6,201,331 B1 * | 3/2001 | Nakano | .......................... | 310/114 |
| 6,211,597 B1 * | 4/2001 | Nakano | .......................... | 310/266 |
| 6,472,845 B2 * | 10/2002 | Minagawa et al. | ........... | 318/801 |
| 6,628,031 B2 * | 9/2003 | Vollmer | .................... | 310/156.45 |
| 6,759,780 B2 * | 7/2004 | Liu et al. | ...................... | 310/184 |
| 6,888,330 B2 * | 5/2005 | Arimitsu | ...................... | 318/433 |
| 6,946,768 B2 * | 9/2005 | Kruse | ........................... | 310/179 |
| 2001/0020805 A1 * | 9/2001 | Nakano et al. | ................ | 310/112 |
| 2003/0001450 A1 * | 1/2003 | Kazmierczak | ................ | 310/184 |
| 2005/0206263 A1 * | 9/2005 | Cai et al. | ....................... | 310/198 |
| 2011/0031838 A1 * | 2/2011 | Serra et al. | ..................... | 310/114 |

FOREIGN PATENT DOCUMENTS

| | | |
|---|---|---|
| EP | 1089425 A | 4/2001 |
| EP | 1107434 A | 6/2001 |
| EP | 1339160 A | 8/2003 |
| GB | 2437568 A | 10/2007 |
| WO | 2007/013742 A2 | 2/2007 |
| WO | 2008/028996 A1 | 3/2008 |

OTHER PUBLICATIONS

European Search Report dated Mar. 8, 2010 issued in Application No. 10153518.5-1242.

Italian Search Report as issued in Application No. BO2009A 000075 filed on Feb. 13, 2009.

* cited by examiner

*Primary Examiner* — John K Kim

(74) *Attorney, Agent, or Firm* — Workman Nydegger

(57) ABSTRACT

An electric machine provided with: a stator, equipped with a single stator winding; at least two shafts, which are independent of one another and are mounted so that they can turn; at least two rotors, which are independent of one another, are magnetically coupled to the stator, and are mounted on the shafts; and a single electronic power converter, which is connected to the stator winding for supplying the stator winding itself with a total electric current.

14 Claims, 12 Drawing Sheets

ELECTRIC MACHINE WITH SINGLE STATOR AND TWO MUTUALLY INDEPENDENT ROTORS, AND ROAD VEHICLE PROVIDED WITH SAID ELECTRIC MACHINE

CROSS-REFERENCE TO RELATED APPLICATIONS

This application claims priority to Italian Patent Application No. BO2009A 000075 filed on Feb. 13, 2009, the disclosure of which is incorporated herein, in its entirety, by this reference.

TECHNICAL FIELD

The present invention relates to an electric machine with single stator and two mutually independent rotors, and moreover relates to a road vehicle provided with said electric machine. The present invention finds advantageous application in a road vehicle, to which the present invention makes explicit reference without this implying any loss of generality.

BACKGROUND

In road vehicles there is an increasing widespread use of electric drive in combination with traditional fuel-burning engine to provide a hybrid drive.

In a first hybrid-drive scheme, an electric machine is mechanically connected to a transmission set between the internal-combustion engine and the driving wheels. In this way, the electric machine does not require transmission elements of its own (i.e., a differential of its own and axle-shafts of its own), but shares the transmission elements of the internal-combustion engine. However, said constructional choice imposes serious problems of management of the overall dimensions, in so far as it is not always simple to find, in the proximity of the transmission of the internal-combustion engine, the space necessary to house the electric machine and the corresponding electronic power converter (which must possibly be set in the proximity of the electric machine so as to contain the length of the electrical connection wires and hence the power losses due to the Joule effect and the voltage drop and electromagnetic disturbance that occur in the electrical connection wires). In addition, if the transmission of the internal-combustion engine originally transmits the torque onto a single axle of the vehicle (i.e., in the case of only front drive or rear drive), also the addition of the electric machine does not modify said situation.

In order to overcome the drawbacks described above a second hybrid-drive scheme has been proposed, wherein a transmission of the internal-combustion engine is envisaged, which transmits the torque of the internal-combustion engine to an axle of the vehicle (front axle or rear axle), and a further transmission of the electric machine is envisaged, which is completely independent of the transmission of the internal-combustion engine and transmits the torque of the electric engine to the other axle of the vehicle (rear axle or front axle). The transmission of the electric machine is simpler than the transmission of the internal-combustion engine in so far as it does not envisage the clutch/gearchange assembly and comprises only a differential, departing from which is a pair of axle-shafts fixed with respect to the driving wheels powered by the electric machine. Said solution presents the advantage of separating the transmission of the internal-combustion engine from the transmission of the electric machine and hence of enabling a greater flexibility in the installation of the electric machine. Furthermore, said solution presents the advantage of being a highly governable engageable four-wheel-drive transmission, which supplies, when necessary, a high driving power (i.e., a high capacity for transmitting the torque to the road).

In order to eliminate the need for the differential in the transmission of the electric machine and to increase the capacity of control of the vehicle a further variant has been proposed, wherein two electric machines are provided identical to one another, each of which transmits the motion directly to a corresponding driving wheel and is preferably set coaxial to the driving wheel itself. In this variant, by driving the two electric machines in a differentiated way, it is possible to differentiate the torque applied to the two electrically powered wheels, i.e., it is possible to provide a "torque vectoring" control, which envisages application of a non-symmetrical torque (obviously only in particular conditions) to increase the propulsion and stability of the road vehicle. By way of example, when going round a bend, the internal wheel is subjected to a higher load than the external wheel and is hence able to transmit a torque to the road, which is higher than that of the external wheel. However, the use of two independent electric machines that must be set sharing one and the same axis sets big problems of overall dimensions along said axis (i.e., of overall transverse dimensions within the vehicle). In addition, the use of two independent electric machines requires the presence of two independent electronic power converters, with an increase in the overall dimensions and with a complication in the electrical connections of the electronic power converters to the electrical-energy accumulation system and in the cooling of the electronic power converters (the electronic power converters are static and hence are able to cool off by self-ventilation only to a limited extent and require an external cooling system).

The patent application No. EP1089425A2 describes an electric machine provided with: a stator equipped with a single stator winding; two shafts, which are independent of one another and are mounted so that they can turn; two rotors, which are independent of one another, are magnetically coupled to the stator, and are mounted on the shafts; and a single electronic power converter, which is connected to the stator winding for supplying the stator winding itself with a total electric current. A first rotor has a first number of pairs of poles made of non-magnetized ferromagnetic material, and a second rotor is a permanent-magnet rotor and has a second number of pairs of poles different from the first number of pairs of poles. The electronic power converter generates a total system of electric currents that circulates through the stator winding and is constituted by the union of a first, dodeca-phase, system of sinusoidal electric currents, which generates a first rotating magnetic field that turns in synchronism with the first rotor, and a second, hexa-phase, system of sinusoidal electric currents, which generates a second rotating magnetic field that turns in synchronism with the second rotor.

The electric machine described in the patent application No. EP1089425A2 necessarily has at least one rotor without permanent magnets that functions according to the principle of variable-reluctance electric machines. In fact, in the patent application No. EP1089425A2 it is excluded that both of the rotors can be equipped with permanent magnets in so far as in this situation an effect of demagnetization arises, which reduces the concentration of the magnetic flux (paragraphs [0069]0 and [0070]). However, variable-reluctance electric machines have an energy efficiency lower than electric machines with permanent-magnet rotors, and hence, as a whole, the electric machine described in the patent application No. EP1089425A2 has a relatively low energy efficiency.

In addition, the electric machine described in the patent application No. EP1089425A2 requires supply of the stator with a dodeca-phase system of electric currents, and the generation of a dodeca-phase system of electric currents entails the use of an electronic power converter that is particularly complex and costly.

Finally, the electric machine described in the patent application No. EP1089425A2 requires the stator winding to have a very small pitch, preferably equal to one, so as to have, in the rotating magnetic fields, even harmonics of significant amplitude (a necessary condition for proper control of the two rotors). However, this means that the pitch of the stator winding is significantly different from the polar pitch of the rotors, and hence, as a whole, the electric machine has a low energy efficiency.

SUMMARY OF THE INVENTION

The aim of the present invention is to provide an electric machine with single stator and two mutually independent rotors, and a road vehicle provided with said electric machine, said electric machine and road vehicle being free from the drawbacks described above and being at the same time easy and inexpensive to produce.

According to the present invention an electric machine with single stator and two mutually independent rotors, and a road vehicle equipped with said electric machine are provided according to what is claimed in the annexed claims.

BRIEF DESCRIPTION OF THE DRAWINGS

The present invention will now be described with reference to the annexed drawings, which illustrate some non-limiting examples of embodiment thereof, and in which.

DETAILED DESCRIPTION OF PREFERRED EMBODIMENTS OF THE INVENTION

Figure 1:
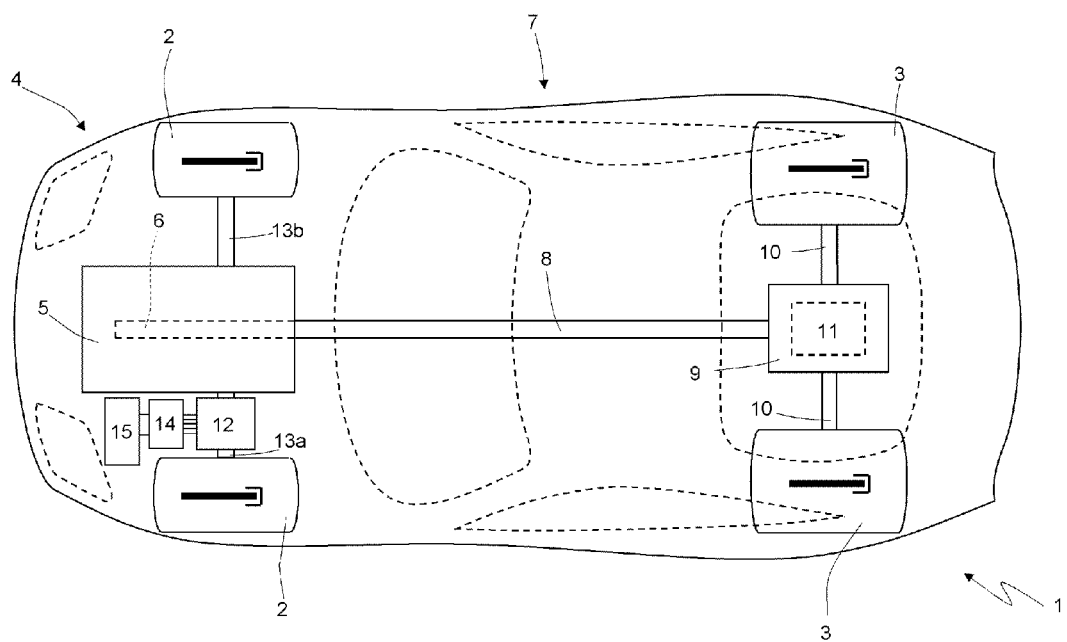
FIG. 1 is a schematic top plan view, with parts removed for reasons of clarity, of a road vehicle provided with an electric machine with single stator and two mutually independent rotors built in accordance with the present invention.

In FIG. 1, number 1 designates as a whole a vehicle (in particular an automobile) provided with two front wheels 2 and of two rear wheels 3, which receive the torque from a hybrid motor-propulsion system 4.

The hybrid motor-propulsion system 4 comprises an internal-combustion engine 5, which is set in front position and is provided with an engine shaft 6, and a transmission 7, which transmits the torque generated by the internal-combustion engine 5 to the rear driving wheels 3. The transmission 7 comprises a transmission shaft 8, which on one side is angularly fixed with respect to the engine shaft 6 and on the other side is mechanically connected to a gearchange 9, which is set in a rear position and transmits the motion to the rear driving wheels 3 by means of two axle-shafts 10 that receive the motion from a differential 11.

In addition, the hybrid motor-propulsion system 4 comprises a reversible electric machine 12 (i.e., one that can function both as electric engine by absorbing electrical energy and generating a mechanical torque and as electric generator by absorbing mechanical energy and generating electrical energy), which is set in a front position and is mechanically connected to the front driving wheels 2 by means of a pair of axle-shafts 13. The reversible electric machine 12 is driven by an electronic power converter 14 connected to an accumulation system 15, which is designed to store electrical energy and comprises a series of accumulation devices, which in turn comprise chemical batteries and/or supercapacitors.

Figure 2:
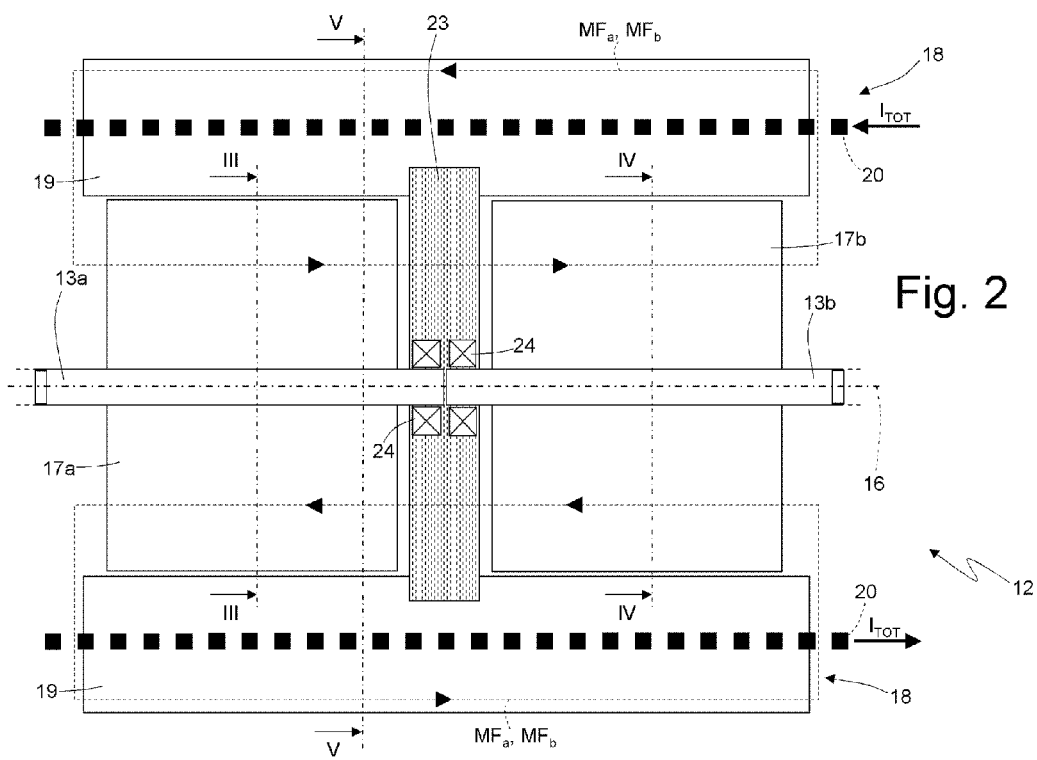
FIG. 2 is a schematic view, partially in cross section and with parts removed for reasons of clarity, of the electric machine of FIG. 1.

According to what is illustrated in FIG. 2, the electric machine 12 comprises two shafts 13, which constitute also the axle-shafts of the front driving wheels 2, are coaxial to one another and independent and are mounted so that they can turn about one and the same axis 16 of rotation that coincides with the axis of rotation of the front wheels 2. The electric machine 12 comprises two rotors 17 (respectively, 17a and 17b), which are mechanically independent of one another and are fitted to the shafts 13, and a single stator 18 of a cylindrical tubular shape set about the two rotors 17 for enclosing within it the two rotors 17 themselves (consequently, the two rotors 17 are magnetically coupled to the stator 18). The stator 18 comprises a ferromagnetic core 19 of a cylindrical tubular shape and a single penta-phase stator winding 20 (schematically illustrated in FIG. 2), the active conductors of which extend parallel to the axis 16 of rotation and are set about the axis 16 of rotation.

Figure 3:
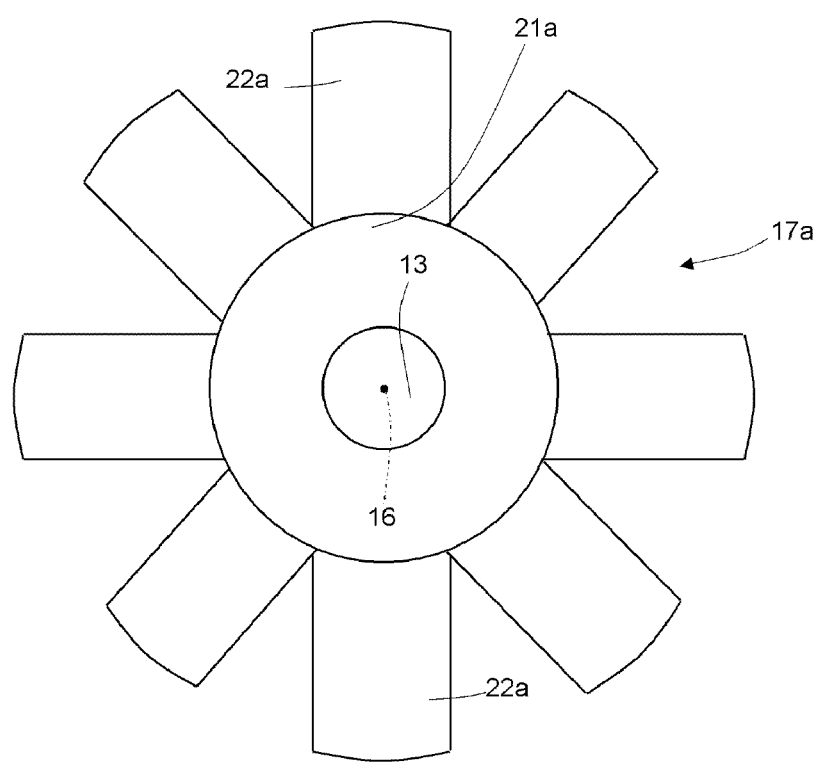
FIG. 3 is a schematic cross section, according to the line III-III and with parts removed for reasons of clarity, of a first rotor of the electric machine of FIG. 1.

According to what is illustrated in FIG. 3, the rotor 17a is a permanent-magnet rotor with eight poles (four pairs of poles) and comprises a magnetic armature 21a of a cylindrical shape fitted to the shaft 13a, and eight permanent magnets 22a, which are uniformly distributed about the axis 16 of rotation and project in cantilever fashion from the magnetic armature 21a. In a similar way, according to what is illustrated in FIG. 4, the rotor 17b is a permanent-magnet rotor with six poles (i.e., three pairs of poles) and comprises a magnetic armature 21b of a cylindrical shape fitted to the shaft 13b, and six permanent magnets 22b, which are uniformly distributed about the axis 16 of rotation and project in cantilever fashion from the magnetic armature 21b.

Figure 4:
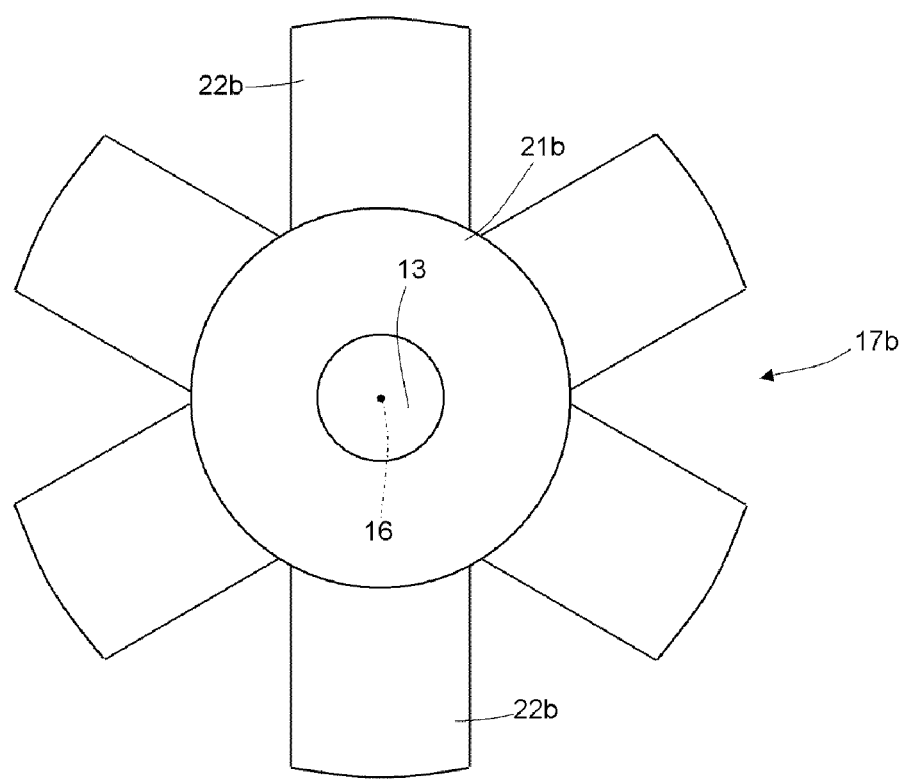
FIG. 4 is a schematic cross section, according to the line IV-IV and with parts removed for reasons of clarity, of a second rotor of the electric machine of FIG. 1.

According to an alternative embodiment, the rotors 17 are once again permanent-magnet ones, but the permanent magnets, instead of being external and set in cantilever fashion as illustrated in FIGS. 3 and 4, are internal, i.e., "embedded" in the magnetic armatures 21 of the rotors 17 themselves. According to a further embodiment, the rotors 17 are permanent-magnet ones and are shaped as reluctance structures with magnetic anisotropy of the rotors 17 themselves.

According to a possible embodiment illustrated in FIG. 2, a separation element 23 is provided, which has a circular flat shape, is set between the two rotors 17, divides the stator 18 into two parts, is made of a magnetic material (for example, aluminium), and supports two bearings 24, each of which is coupled to a respective shaft 13. In addition to supporting the bearings 24 mechanically, the separation element 23 enables a certain separation to be obtained between the magnetic fluxes of the two rotors 17, creating an airgap between the two rotors 17 themselves; in this way, the undesirable interactions of the magnetic flux generated by one rotor 17 on the other rotor 17 are reduced.

Figure 5:
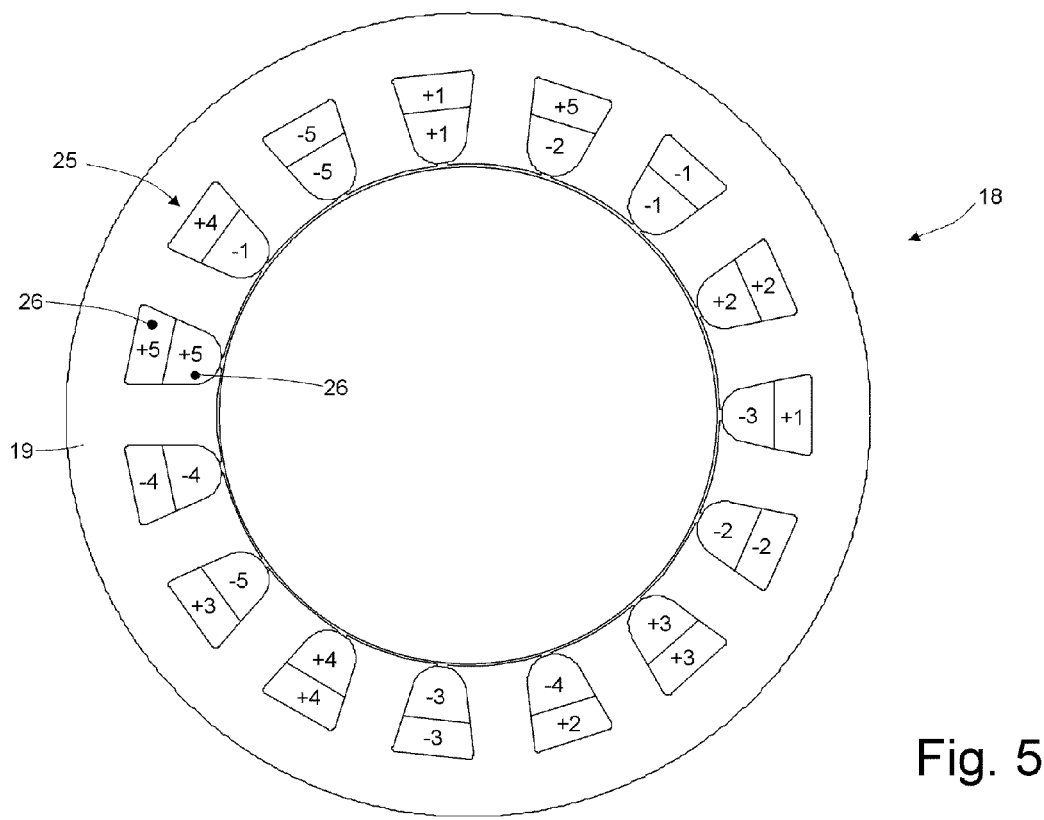
FIG. 5 is a schematic cross section, according to the line V-V and with parts removed for reasons of clarity, of the single stator of the electric machine of FIG. 1.

According to what is illustrated in FIG. 5, the stator 18 comprises the ferromagnetic core 19 of a cylindrical tubular shape, and the single penta-phase stator winding 20, the active conductors of which extend parallel to, and are set about, the axis 16 of rotation. The stator winding 20 comprises a plurality of coils, which are set in corresponding slots 25 obtained through the ferromagnetic core 19 and are connected to one another so as to define five distinct phases. Each coil comprises two active sides 26, which are set in two different slots 25, and in each slot 25 two active sides 26 of two different coils are set superimposed on one another (i.e., the stator winding 20 is a double-layer one). The stator winding 20 illustrated in FIG. 5 is penta-phase, with double layer, with 15 slots and with coils having a pitch equal to 1-3; the numbers given in FIG. 5 corresponding to the various active sides of the coils indicate the phase that occupies the corresponding layer, whilst the sign indicates the direction of flow.

Figure 6:
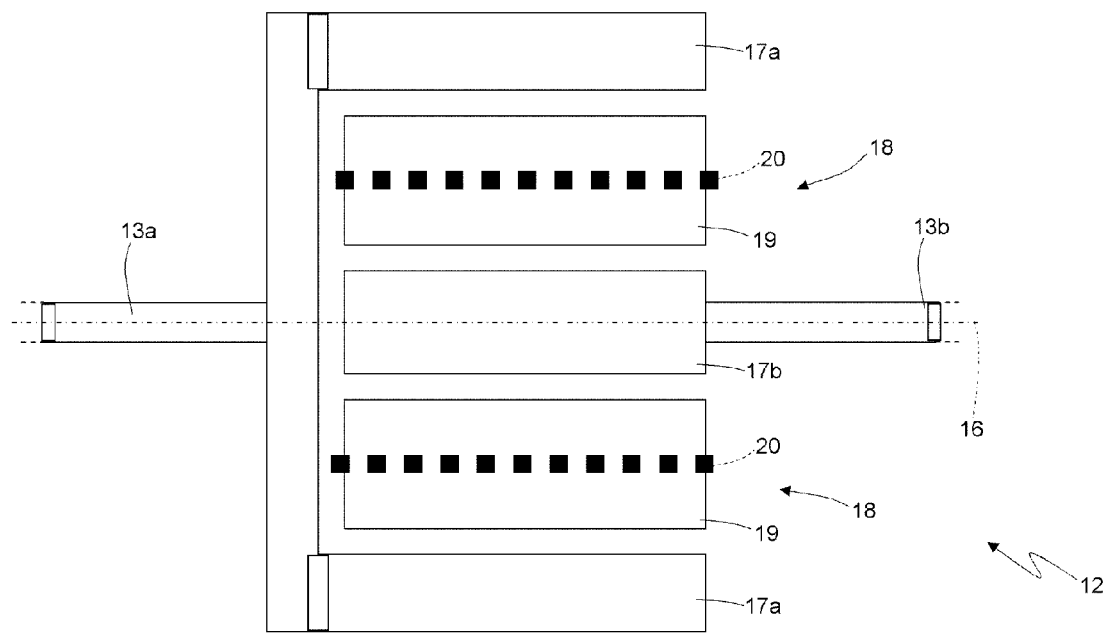
FIGS. 6 and 7 are schematic views, partially in cross section and with parts removed, of two constructional variants of the electric machine of FIG. 1.
Figure 7:
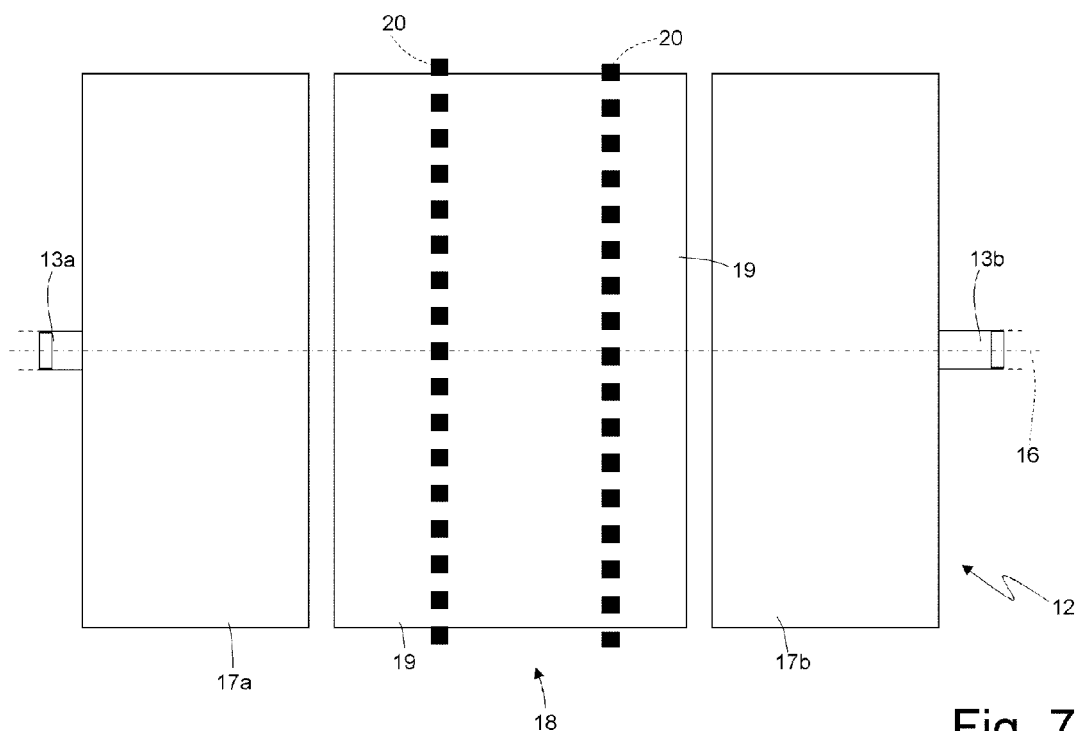

In the embodiment illustrated in FIG. 2, the two rotors 17 are set alongside one another. Instead, in the variant illustrated in FIG. 6, the two rotors 17 are set inside one another. In particular, in the variant illustrated in FIG. 6, the rotor 17a is cup-shaped, is set around the stator 18, and contains inside it the stator 18 itself, and the rotor 17b is set within the stator 18 and hence also within the rotor 17a. In the embodiment illustrated in FIG. 7, the stator 18 is set between the two rotors 17, and the stator windings 20 are set perpendicular to the axis 16 of rotation.

The penta-phase stator winding 20 is made in such a way that, when it is traversed by a first penta-phase system of sinusoidal electric currents $I_a$, it generates a first rotating magnetic field $MF_a$, which has a fourth harmonic that is very important (i.e., of high intensity) and a third harmonic that is negligible (i.e., of low intensity). In other words, when the penta-phase stator winding 20 is traversed by the first penta-phase system of sinusoidal electric currents $I_a$, it generates the first rotating magnetic field $MF_a$ in which the harmonic of greatest amplitude is the fourth harmonic whilst the third harmonic is negligible. In addition, the penta-phase stator winding 20 is made in such a way that, when traversed by a second penta-phase system of sinusoidal electric currents $I_b$, it generates a second rotating magnetic field $MF_b$, which has a third harmonic that is very important (i.e., of high intensity) and a fourth harmonic that is negligible (i.e., of low intensity). In other words, when the penta-phase stator winding 20 is traversed by the second penta-phase system of sinusoidal electric currents $I_b$, it generates the second rotating magnetic field $MF_b$ in which the harmonic of greatest amplitude is the third harmonic, whereas the fourth harmonic is negligible.

The first rotating magnetic field $MF_a$, since it has a very important fourth harmonic (i.e., of high intensity) and a negligible third harmonic, drives in rotation the rotor 17a that has eight permanent magnets 22a (i.e., four pairs of poles), but has practically no effect on the rotor 17b that has six perma-nent magnets 22b (i.e., three pairs of poles). Likewise, the second rotating magnetic field $MF_b$, since it has a very important third harmonic (i.e., of high intensity) and a negligible fourth harmonic, drives in rotation the rotor 17b that has six permanent magnets 22b, but has practically no effect on the rotor 17a that has eight permanent magnets 22a. In other words, the rotor 17a that has eight permanent magnets 22a is driven in rotation by the fourth harmonic of a rotating magnetic field (i.e., the fourth harmonic of a rotating magnetic field generates on the rotor 17a a nonzero torque), but is not driven in rotation by the third harmonic of a rotating magnetic field (i.e., the third harmonic of a rotating magnetic field generates on the rotor 17a a torque that is on average zero). Likewise, the rotor 17b that has six permanent magnets 22b is driven in rotation by the third harmonic of a rotating magnetic field (i.e., the third harmonic of a rotating magnetic field generates on the rotor 17b a nonzero torque), but is not driven in rotation by the fourth harmonic of a rotating magnetic field (i.e., the fourth harmonic of a rotating magnetic field generates on the rotor 17b a torque that is on average zero).

The electronic power converter 14 generates a total penta-phase system of electric currents $I_{TOT}$ that circulates through the stator winding 20 and is constituted by the union of a penta-phase system of sinusoidal electric currents $I_a$ of frequency $f_a$, which generates a magnetic field $MF_a$ rotating at a velocity of rotation $\omega_a$ (directly proportional to the frequency $f_a$) and having a very important fourth harmonic and a negligible third harmonic, and of a penta-phase system of sinusoidal electric currents $I_b$ of frequency $f_b$, which generates a magnetic field $MF_b$ rotating at a velocity of rotation $\omega_b$ (directly proportional to the frequency $f_b$) and having a very important third harmonic and a negligible fourth harmonic. The penta-phase system of sinusoidal electric currents $I_a$ is generated only as a function of the control requirements of the rotor 17a, whereas the penta-phase system of sinusoidal electric currents $I_b$ is generated only as a function of the control requirements of the rotor 17b. The total penta-phase system of electric currents $I_{TOT}$ that is made to circulate through the stator winding 20 is the result of the algebraic sum of the penta-phase systems of sinusoidal electric currents $I_a$ and $I_b$.

It should be noted that the first system of sinusoidal electric currents $I_a$ and the second system of sinusoidal electric currents $I_b$ have an identical number of phases (i.e., five), which is equal to the number of phases of the stator winding 20. In general, the number of phases of the stator winding 20 (and hence of the systems of sinusoidal electric currents I) depends upon the number of rotors 17 present and is necessarily odd and equal to twice the number of the rotors 17 increased by one. Hence, in the case of two rotors 17, the number of phases of the stator winding 20 is equal to five, whereas in the case of three rotors 17 it is equal to seven. It should be noted that the number of phases of the stator winding 20 must be as small as possible, given that, as the number of phases of the stator winding 20 increases, the complexity, size, and cost of the electronic power converter 14 increase. The theoretical rule (i.e., from a standpoint of theoretical feasibility) envisages that the number of phases of the stator winding 20 is odd and not lower than twice the number of the rotors 17 increased by one, but, if also the need to minimize the costs is taken into account, the practical rule envisages that the number of phases of the stator winding 20 is equal to twice the number of the rotors 17 increased by one.

It should be noted that, since the penta-phase system of sinusoidal electric currents $I_a/I_b$ is generated only as a function of the control requirements of the rotor 17a/17b, the frequency of the penta-phase system of sinusoidal electric currents $I_a/I_b$ depends only upon the velocity of rotation $\omega_a/\omega_b$ of the rotor 17a/17b. In other words, the frequency of the penta-phase system of sinusoidal electric currents $I_a/I_b$ is directly proportional to the velocity of rotation $\omega_a/\omega_b$ of the rotor 17a/17b and to the number N1/N2 of pairs of poles of the rotor 17a/17b. Hence, generally the frequencies of the two penta-phase systems of sinusoidal electric currents $I_a$ and $I_b$ are different and are the same as one another only in the particular case where the two rotors 17a and 17b turn with velocity of rotations $\omega_a$ and $\omega_b$ that have a ratio equal to the ratio of the respective numbers N1 and N2 of pairs of poles (i.e., with velocity of rotations $\omega_a$ and $\omega_b$ inversely proportional to the numbers N1 and N2 of pairs of poles).

To summarize and generalize what has been described above, the rotor 17a is a permanent-magnet one and has a number N1 of pairs of poles (equal to four in the embodiment illustrated), the rotor 17b is a permanent-magnet one and has a number N2 of pairs poles (equal to three in the embodiment illustrated) different from the number N1 of pairs of poles, and the stator winding 20 has an odd number of phases at least equal to five. When the stator winding 20 is traversed by a penta-phase system of sinusoidal electric currents $I_a$, it generates a rotating magnetic field $MF_a$ that has a very important harmonic of order equal to the number N1 of pairs of poles and negligible harmonics of order equal to the number N2 of pairs of poles or to a multiple thereof, and, when it is traversed by a penta-phase system of sinusoidal electric currents $I_b$ different from the penta-phase system of sinusoidal electric currents $I_a$, it generates a rotating magnetic field $MF_b$ that has a very important harmonic of order equal to the number N2 of pairs of poles and negligible harmonics of order equal to the number N1 of pairs of poles or to a multiple thereof.

According to a preferred embodiment, the difference between the numbers N1 and N2 of pairs of poles is an integer and is equal to one (more in general, it is never higher than eight-ten); this characteristic enables optimization of the performance of the electric machine 12a, given the same weights/overall dimensions.

Figure 11:
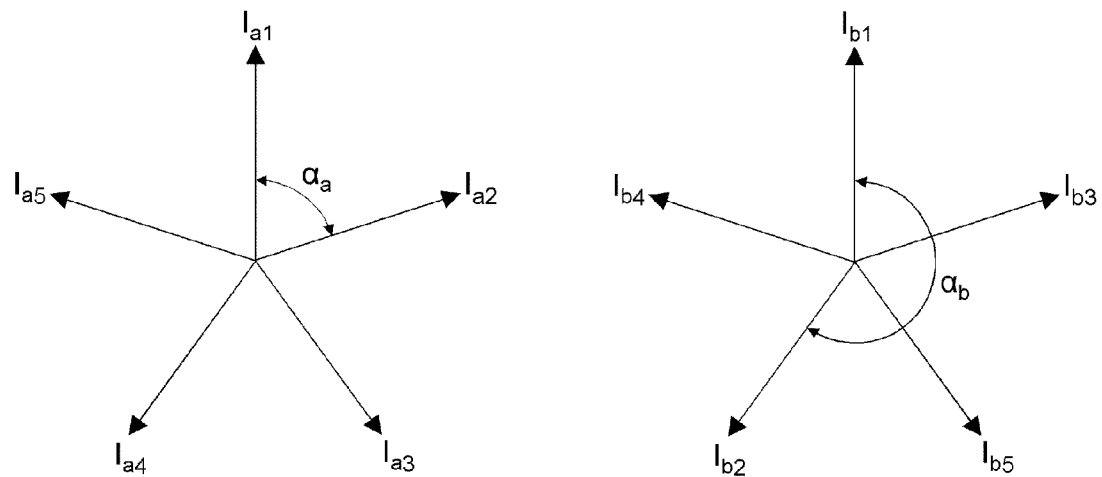
FIG. 11 shows the phase shifts between the phases of two penta-phase systems of sinusoidal electric currents that circulate in use in the stator winding of the electric machine of FIG. 1.

As illustrated in FIG. 11, the penta-phase systems of sinusoidal electric currents $I_a$ and $I_b$ differ from one another not only for the different frequencies $f_a$ and $f_b$ (that depend only upon the velocity of rotations $\omega_a$ and $\omega_b$ of the rotors 17a and 17b), but also for the phase shifts between the various phases, i.e., for the delay angle $\alpha$ existing between the current of one phase and the current of the next phase. The penta-phase system of sinusoidal electric currents $I_a$ has a delay angle $\alpha_a$ of 72°; i.e., it is a so-called "first-order system". Instead, the penta-phase system of sinusoidal electric currents $I_b$ has a delay angle $\alpha_b$ of 216°; i.e., it is a system so-called "third-order system". The order of a penta-phase system of sinusoidal electric currents is defined by the following equation:

Order=delay angle/(360°/number of phases)

Thanks to the fact that the two penta-phase systems of sinusoidal electric currents $I_a$ and $I_b$ have different delay angles $\alpha$, by circulating through the same stator winding 20, they generate rotating magnetic fields $MF_a$ and $MF_b$ different from one another and in particular having a different harmonic content. Obviously, the differences in the delay angles $\alpha$ of the two penta-phase systems of sinusoidal electric currents $I_a$ and $I_b$ must be determined as a function of the characteristics of the stator winding 20 to obtain the two desired rotating magnetic fields $MF_a$ and $MF_b$.

As regards the choice of the type of stator winding 20, the criterion to be used is the search for a winding that, when traversed by a sinusoidal current (i.e., by a single phase of a multiphase system) generates a stationary magnetic field having two dominant harmonics, which must be much more important than the other harmonics, must be approximately the same as one another (i.e., they must not have excessively significant differences of intensity with respect to one another), and must have harmonic orders that are close to one another.

The fact that the stationary magnetic field generated by a sinusoidal current that traverses the stator winding 20 has two dominant harmonics is linked to the fact that it is necessary to generate two rotating magnetic fields $MF_a$ and $MF_b$ different from one another and in particular having a different harmonic content.

The fact that the stationary magnetic field generated by a sinusoidal current that traverses the stator winding 20 must have two dominant harmonics approximately the same as one another is linked to the fact that the two rotating magnetic fields $MF_a$ and $MF_b$ must have similar intensities (given the same intensity of the current) not to determine any excessively significant imbalance in the torques generated in the two rotors 17a and 17b. Obviously, the torque that is generated in a rotor 17a/17b depends upon the intensity of the rotating magnetic field $MF_a/MF_b$ and upon the number of pairs N1/N2 of poles. Hence, a difference in the intensity of the rotating magnetic fields $MF_a$ and $MF_b$ can be compensated for by a corresponding difference in the number of pairs N1 and N2 of poles. In addition, a small residual difference in the intensity of the rotating magnetic fields $MF_a$ and $MF_b$ can be compensated for by a corresponding difference in the axial dimensions of the two rotors 17a and 17b (i.e., one rotor 17a/17b is longer than the other rotor 17b/17a). It should be pointed out that, by acting appropriately on the intensities of the electric currents, it is always possible to obtain the desired intensities of the rotating magnetic fields $MF_a$ and $MF_b$, but it is expedient that, given the same intensities of the electric currents, the intensities of the rotating magnetic fields $MF_a$ and $MF_b$ should be as close as possible to guarantee a good symmetry to the ensemble and hence prevent any constructional dissimmetries that complicate production and also increase the total cost.

The fact that the stationary magnetic field generated by a sinusoidal current that traverses the stator winding 20 must have two dominant harmonics close to one another is linked to the fact that, for constructional reasons, the numbers of pairs N1 and N2 of poles of the two rotors 17a and 17b must not be excessively different from one another.

From studies conducted by the inventors, the stator winding 20 must necessarily be of a fractional type; i.e., it must present a non-integer number of slots per pole and per phase with respect to both of the rotors 17 (by way of example, the stator winding 20 illustrated in FIG. 5 has 0.5 slots per pole and per phase with respect to the rotor 17b with 6 poles and has 0.375 slots per pole and per phase with respect to the rotor 17a with 8 poles). In fact, on the basis of what has been discovered, only fractional stator windings 20 are suitable for the independent control of the two rotors 17 described above.

If we limit our analysis to a penta-phase stator winding (i.e., one provided with five distinct phases) and to a number of slots 25 not higher than fifty (a higher number of slots requires a very large diameter of the stator 18, which entails a high encumbrance and total weight of the reversible electric machine 12, which are hence not compatible with the use in the automotive field), all and only the possible stator windings that have in an optimal way the characteristics required and can thus be used with the maximum efficiency in the reversible electric machine 12 described above are described in the attached tables I-XXVI. It should be pointed out that, if we consider only the penta-phase stator windings provided with not more than fifty slots 25, there do not exist other stator windings that can be used with the same efficiency in the reversible electric machine 12 described above except for those described in the attached Tables I-XXVI (in other words, other stator windings, which are also very similar to those described in the attached Tables I-XXVI, bestow upon the reversible electric machine 12 lower efficiency).

In the attached Tables I-XXVI it is assumed that the phases of the penta-phase stator winding are numbered from 1 to 5. The attached Tables I-XXVI represent the basic elements for the arrangement of the windings in the slots 25; it is assumed that associated to each slot 25 is a progressive number in a clockwise or else counterclockwise direction (the clockwise or counterclockwise direction of numbering does not affect the effectiveness of the stator winding but only the direction of rotation of the rotors 17; hence the stator winding can be built indifferently in either way). The choice of the slot N. 1 is arbitrary. In the attached Tables I-XXVI:

the first column "Slot" identifies the number of the slot 25;

the second column "Layer 1" represents the number of the phase that must occupy the internal layer of the stator winding (the possible minus sign in front to the number represents the fact that the direction, assumed positive, of flow of the current in that side must be opposite to that of the sides where the numbers are positive); and the third column "Layer 2" represents the number of the phase that must occupy the external layer of the winding (the possible minus sign in front of the number represents the fact that the direction, assumed positive, of flow of the current in that side must be opposite to that of the sides where the numbers are positive).

It is to be noted that the definitions of "internal" and "external" may also be, indifferently, reversed; i.e., the stator winding may be obtained indifferently in either way.

All the alternative arrangements that can be brought back to those of the annexed Tables I-XXVI by means of the correspondences illustrated in the ensuing table are to be considered equivalent to those represented in the attached Tables I-XXVI:

|  | Numbering the phases in the tables | | | | |
| --- | --- | --- | --- | --- | --- |
|  | 1 | 2 | 3 | 4 | 5 |
| Alternative A | 1 | 3 | 5 | 2 | 4 |
| Alternative B | 1 | 4 | 2 | 5 | 3 |
| Alternative C | 1 | 5 | 4 | 3 | 2 |

It should be noted that the stator winding 20 described in Table I corresponds to the stator winding 20 described above in detail and illustrated in FIG. 5; the comparison between Table I and FIG. 5 clarifies further the way of interpreting the attached Tables I-XXVI.

The constructional details of a penta-phase fractional stator winding are known in the literature and can also be directly derived from the modalities of production of a three-phase fractional stator winding (which are described, by way of example, in the book by Di Pierro, "Costruzioni Elettromeccaniche", SIDEREA, Rome).

It should be noted that in the stator windings 20 described above, the pitch of the stator windings 20 (i.e., the distance, measured for example in slots, between the two active sides of one and the same coil) is close to the polar pitches of the two rotors 17 (i.e., the distance, measured for example in slots, between two consecutive poles of a rotor 17) and preferably is approximately "centroidal" with respect to the polar pitches of the two rotors 17 (i.e., it is set, as far as possible, approximately halfway between the polar pitches of the two rotors 17). Thanks to this characteristic, the energy efficiency of the electric machine 12 is particularly high. With reference to the stator winding 20 illustrated in FIG. 5, the pitch of the stator winding 20 is equal to two slots, the polar pitch of the rotor 17a is equal to 1.875 slots (=15/8), and the polar pitch of the rotor 17b is equal to 2.5 slots (=15/6). It may hence be seen how the pitch of the stator winding 20 (equal to two) is approximately centroidal between the polar pitch of the rotor 17a (equal to 1.875) and the polar pitch of the rotor 17b (equal to 2.5).

Figure 8:
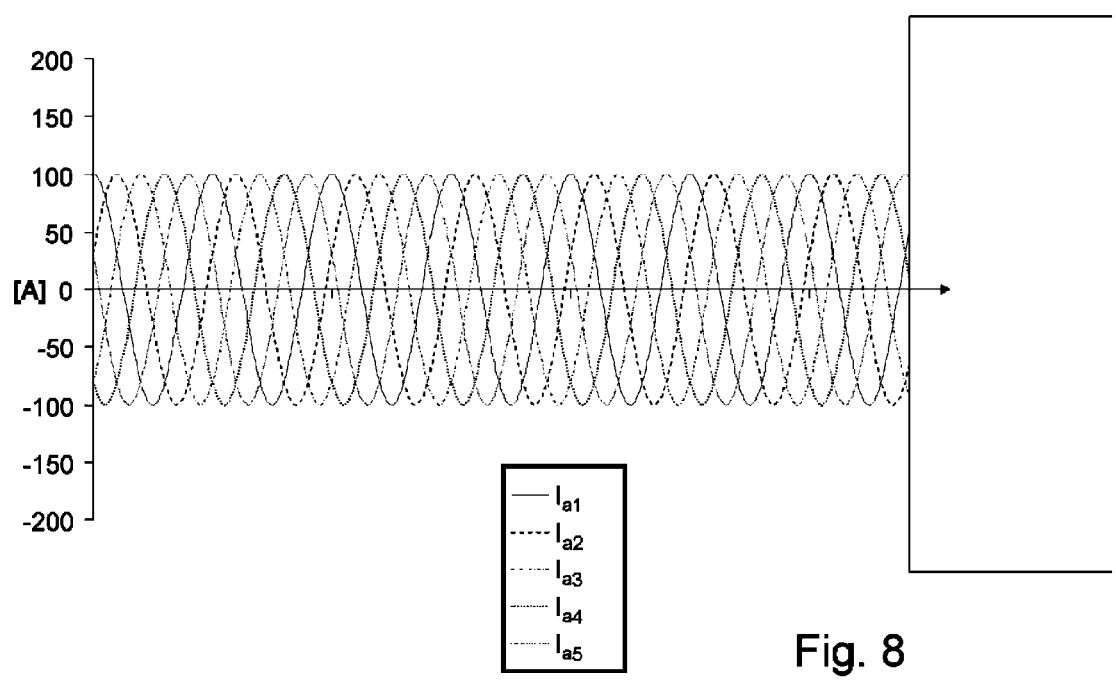
FIGS. 8, 9 and 10 are graphs that illustrate the temporal evolution of penta-phase systems of electric currents that circulate in use in the stator winding of the electric machine of FIG. 1.
Figure 9:
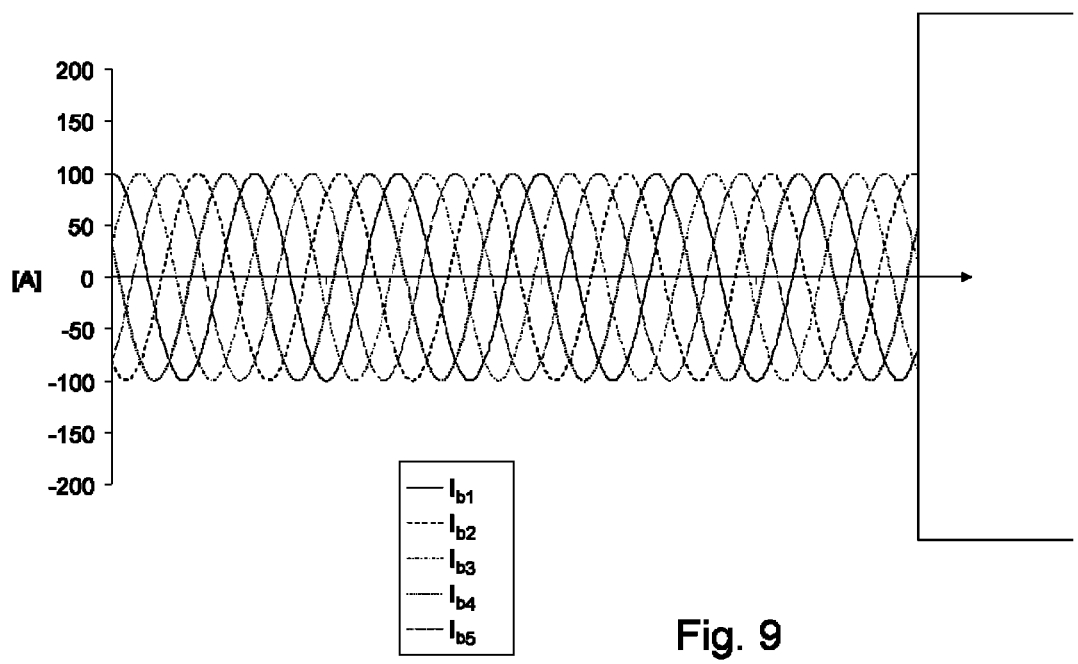
Figure 10:
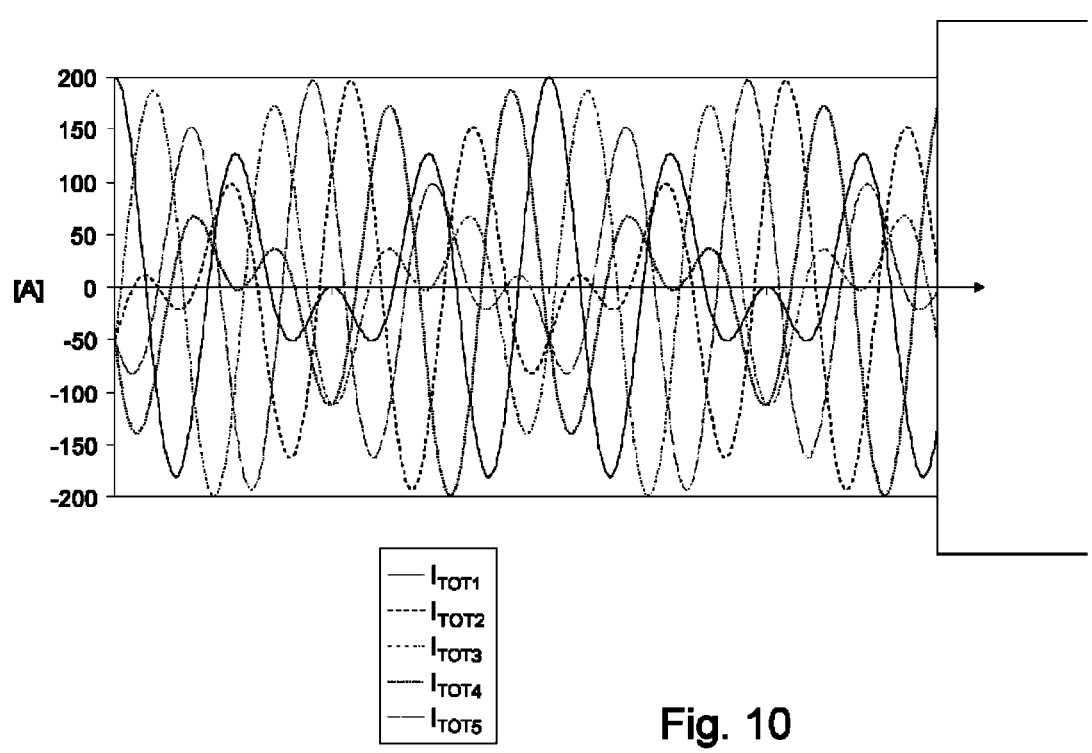

FIG. 8 illustrates an example of the penta-phase system of sinusoidal electric currents $I_a$ for control of just the rotor 17a, FIG. 9 illustrates an example of the penta-phase system of sinusoidal electric currents $I_b$ for control of just the rotor 17b, and FIG. 10 illustrates an example of the total penta-phase system of electric currents $I_{TOT}$ that traverses the stator winding 20 in the case where the two rotors 17 turn at the same angular speed ω.

Figure 12:
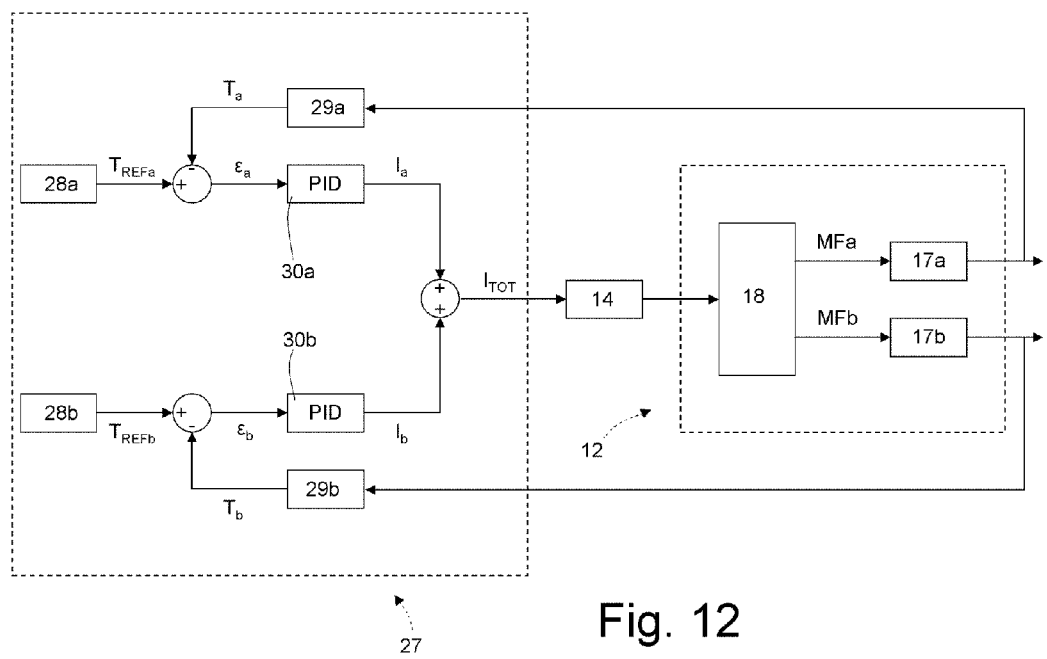
FIG. 12 is a block diagram of a control logic of the electric machine of FIG. 1.

An example of a control scheme of the electric machine 12 is represented in FIG. 12. It should be pointed out that the electric machine 12 is controlled in torque in so far as the velocity of rotation of the rotors 17 is set by the speed of advance of the vehicle 1. In other words, the rotors 17 are angularly fixed with respect to the front wheels 2; consequently, the velocity of rotation of the rotors 17 is set by the speed of advance of the vehicle 1 (in the absence of skidding of the front wheels 2, which is an event to avoid in any possible way in so far as it reduces the driving power and the stability of the vehicle 1); hence, it is convenient to control the driving/braking torque generated/absorbed by the rotors 17.

The electronic power converter 14 is driven by a control unit 27, comprising a reference block 28a/28b, which generates a reference torque $T_{REFa}/T_{REFb}$ for the rotor 17a/17b that is followed by means of a closed-loop control (i.e., in feedback mode). The effective torque $T_a/T_b$ to the shaft 13a/13b of the rotor 17a/17b is estimated by an estimator block 29a/29b and is compared with the reference torque $T_{REFa}/T_{REFb}$ for determining a torque error $\epsilon_a/\epsilon_b$, which is processed by a PI (proportional-integral) regulator 30a/30b so as to generate the desired value of the penta-phase system of sinusoidal electric currents $I_a/I_b$. The two penta-phase systems of sinusoidal electric currents $I_a$ and $I_b$ are then added to one another to determine the desired value of the total penta-phase system of electric currents $I_{TOT}$ that circulates through the stator winding 20. The total penta-phase system of electric currents $I_{TOT}$, by circulating through the stator winding 20, generates a rotating magnetic field $MF_a$, which that has a very important fourth harmonic and a negligible third harmonic as a result of the component constituted by the penta-phase system of sinusoidal electric currents $I_a$ and generates a rotating magnetic field $MF_b$, which has a very important third harmonic and a negligible fourth harmonic as a result the component constituted by the penta-phase system of sinusoidal electric currents $I_b$.

As has been said previously, the rotating magnetic field $MF_a/MF_b$ generates a nonzero average torque only on the rotor 17a/17b, and hence the penta-phase system of sinusoidal electric currents $I_a/I_b$ has an effect only on the corresponding rotor 17a/17b. In this way, from the control standpoint, the electric machine 12, albeit having a single stator 18 and a single stator winding 20, may be viewed to all effects as two distinct and independent electric machines.

In the embodiment described above there is envisaged the use of penta-phase systems of sinusoidal electric currents $I_a$ and $I_b$; obviously, according to different embodiments, it is possible to use systems of sinusoidal electric currents $I_a$ and $I_b$ with number of phases higher than five, for example, with seven or nine phases.

In the embodiment described above, the presence of two rotors 17a and 17b is envisaged; obviously, according to different embodiments, more than two rotors 17 can be used having a different number of pairs of poles.

The electric machine 12 can be used as electric engine (absorbing electrical energy and generating a mechanical torque) for generating a driving torque that can be added to or replace the driving torque generated by the internal-combustion engine 5. In addition, the electric machine 12 can be used as electric generator (absorbing mechanical energy and generating electrical energy) for generating a braking torque, which, during slowing-down of the vehicle 1, enables recovery of part of the kinetic energy possessed by the vehicle 1 itself (regenerative braking). In particular, the electric machine 12 can be used as electric motor to render also the front wheels 2 driving wheels so as to obtain an (engageable) four-wheel drive to increase the driving power (i.e., the capacity for transmitting the torque to the road) in conditions of poor adherence.

In addition, since the electric machine 12 has an independent control of the driving/braking torques applied to the front wheels 2, it enables a "torque vectoring" control to be obtained, which envisages application of a non-symmetrical driving/braking torque in order to increase propulsion and stability of the vehicle 1. By way of example, when going round a bend, the internal wheel is subjected to a higher load than the external wheel and is hence able to transmit to the road a torque higher than the external wheel.

The electric machine 12 described above presents numerous advantages. In the first place, it is simple and inexpensive to produce in so far as it is structurally similar to a conventional electric machine and hence does not require particular and dedicated equipment for its production. As compared to the solution with two electric machines that are completely separate and independent, the electric machine 12 described above requires a single electronic power converter 14, which supplies a single stator winding 20, with an evident saving in cost, weight, and overall dimensions of the electronic power converter 14 itself. In addition, a single electronic power converter 14 connected to a single stator winding 20 simplifies and reduces the total length of the electric wiring (also with the accumulation system 15) and simplifies cooling of the electronic power converter 14 (which is static and is hence able to cool off by self-ventilation only to a very limited extent and requires an external cooling system).

As compared to the solution with two completely separate electric machines, the electric machine 12 described above presents a reduced axial encumbrance, in so far as the number of the heads of the stator windings and of the shields is halved. In other words, with two electric machines completely separate, two separate stator windings are present and four heads and four shields (two for each stator) are hence necessary, whereas, in the electric machine 12, described above a single stator winding 20 is present and only two heads and two shields are hence necessary. Thanks to its reduced axial encumbrance, the electric machine 12 described above is particularly suitable for being set in a vehicle so as to act on two wheels of one and the same axle.

Even though the electric machine 12 described above finds optimal use in motor-vehicle propulsion, it can be applied also in other fields in which it is necessary to control at least two axles in an independent way. Obviously, the electric machine 12 could comprise also more than two rotors 17. Of course, to increase the number of rotors 17, it is necessary to increase the number of phases of the stator winding 20 adequately (for example, in the case of three rotors 17, the stator winding 20 must be at least hepta-phase).

TABLE I

Stator winding 20 = 15 slots
Rotor 17a = 8 poles - Rotor 17b = 6 poles

| Slot | Layer 1 | Layer 2 |
|---|---|---|
| 1 | −3 | 1 |
| 2 | 2 | 2 |
| 3 | −1 | −1 |
| 4 | −2 | 5 |
| 5 | 1 | 1 |
| 6 | −5 | −5 |
| 7 | −1 | 4 |
| 8 | 5 | 5 |
| 9 | −4 | −4 |
| 10 | −5 | 3 |
| 11 | 4 | 4 |
| 12 | −3 | −3 |
| 13 | −4 | 2 |
| 14 | 3 | 3 |
| 15 | −2 | −2 |

TABLE II

Stator winding 20 = 20 slots
Rotor 17a = 18 poles - Rotor 17b = 14 poles

| Slot | Layer 1 | Layer 2 |
|---|---|---|
| 1 | 1 | 1 |
| 2 | −1 | 3 |
| 3 | −3 | −3 |
| 4 | 3 | −5 |
| 5 | 5 | 5 |
| 6 | −5 | 2 |
| 7 | −2 | −2 |
| 8 | 2 | −4 |
| 9 | 4 | 4 |
| 10 | −4 | 1 |
| 11 | −1 | −1 |
| 12 | 1 | −3 |
| 13 | 3 | 3 |
| 14 | −3 | 5 |
| 15 | −5 | −5 |
| 16 | 5 | −2 |
| 17 | 2 | 2 |
| 18 | −2 | 4 |
| 19 | −4 | −4 |
| 20 | 4 | −1 |

TABLE III

Stator winding 20 = 25 slots
Rotor 17a = 12 poles - Rotor 17b = 14 poles

| Slot | Layer 1 | Layer 2 |
|---|---|---|
| 1 | 1 | 1 |
| 2 | 2 | 2 |
| 3 | −1 | 3 |
| 4 | −2 | −2 |
| 5 | −3 | −3 |
| 6 | 2 | 2 |
| 7 | 3 | 3 |
| 8 | −2 | 4 |
| 9 | −3 | −3 |
| 10 | −4 | −4 |
| 11 | 3 | 3 |
| 12 | 4 | 4 |
| 13 | −3 | 5 |
| 14 | −4 | −4 |

TABLE III-continued

Stator winding 20 = 25 slots
Rotor 17a = 12 poles - Rotor 17b = 14 poles

| Slot | Layer 1 | Layer 2 |
|---|---|---|
| 15 | −5 | −5 |
| 16 | 4 | 4 |
| 17 | 5 | 5 |
| 18 | −4 | 1 |
| 19 | −5 | −5 |
| 20 | −1 | −1 |
| 21 | 5 | 5 |
| 22 | 1 | 1 |
| 23 | −5 | 2 |
| 24 | −1 | −1 |
| 25 | −2 | −2 |

TABLE IV

Stator winding 20 = 30 slots
Rotor 17a = 14 poles - Rotor 17b = 18 poles

| Slot | Layer 1 | Layer 2 |
|---|---|---|
| 1 | 1 | 1 |
| 2 | 2 | 2 |
| 3 | −1 | 3 |
| 4 | −2 | −2 |
| 5 | −3 | −3 |
| 6 | 2 | −4 |
| 7 | 3 | 3 |
| 8 | 4 | 4 |
| 9 | −3 | 5 |
| 10 | −4 | −4 |
| 11 | −5 | −5 |
| 12 | 4 | −1 |
| 13 | 5 | 5 |
| 14 | 1 | 1 |
| 15 | −5 | 2 |
| 16 | −1 | −1 |
| 17 | −2 | −2 |
| 18 | 1 | −3 |
| 19 | 2 | 2 |
| 20 | 3 | 3 |
| 21 | −2 | 4 |
| 22 | −3 | −3 |
| 23 | −4 | −4 |
| 24 | 3 | −5 |
| 25 | 4 | 4 |
| 26 | 5 | 5 |
| 27 | −4 | 1 |
| 28 | −5 | −5 |
| 29 | −1 | −1 |
| 30 | 5 | −2 |

TABLE V

Stator winding 20 = 30 slots
Rotor 17a = 16 poles - Rotor 17b = 12 poles

| Slot | Layer 1 | Layer 2 |
|---|---|---|
| 1 | −3 | 1 |
| 2 | 2 | 2 |
| 3 | −1 | −1 |
| 4 | −2 | 5 |
| 5 | 1 | 1 |
| 6 | −5 | −5 |
| 7 | −1 | 4 |
| 8 | 5 | 5 |
| 9 | −4 | −4 |
| 10 | −5 | 3 |
| 11 | 4 | 4 |
| 12 | −3 | −3 |
| 13 | −4 | 2 |

TABLE V-continued

Stator winding 20 = 30 slots
Rotor 17a = 16 poles - Rotor 17b = 12 poles

| Slot | Layer 1 | Layer 2 |
|---|---|---|
| 14 | 3 | 3 |
| 15 | −2 | −2 |
| 16 | −3 | 1 |
| 17 | 2 | 2 |
| 18 | −1 | −1 |
| 19 | −2 | 5 |
| 20 | 1 | 1 |
| 21 | −5 | −5 |
| 22 | −1 | 4 |
| 23 | 5 | 5 |
| 24 | −4 | −4 |
| 25 | −5 | 3 |
| 26 | 4 | 4 |
| 27 | −3 | −3 |
| 28 | −4 | 2 |
| 29 | 3 | 3 |
| 30 | −2 | −2 |

TABLE VI

Stator winding 20 = 35 slots
Rotor 17a = 16 poles - Rotor 17b = 22 poles

| Slot | Layer 1 | Layer 2 |
|---|---|---|
| 1 | 1 | 1 |
| 2 | 2 | 2 |
| 3 | −1 | 3 |
| 4 | −2 | 4 |
| 5 | −3 | −3 |
| 6 | −4 | −4 |
| 7 | 3 | −5 |
| 8 | 4 | 4 |
| 9 | 5 | 5 |
| 10 | −4 | 1 |
| 11 | −5 | 2 |
| 12 | −1 | −1 |
| 13 | −2 | −2 |
| 14 | 1 | −3 |
| 15 | 2 | 2 |
| 16 | 3 | 3 |
| 17 | −2 | 4 |
| 18 | −3 | 5 |
| 19 | −4 | −4 |
| 20 | −5 | −5 |
| 21 | 4 | −1 |
| 22 | 5 | 5 |
| 23 | 1 | 1 |
| 24 | −5 | 2 |
| 25 | −1 | 3 |
| 26 | −2 | −2 |
| 27 | −3 | −3 |
| 28 | 2 | −4 |
| 29 | 3 | 3 |
| 30 | 4 | 4 |
| 31 | −3 | 5 |
| 32 | −4 | 1 |
| 33 | −5 | −5 |
| 34 | −1 | −1 |
| 35 | 5 | −2 |

TABLE VII

Stator winding 20 = 35 slots
Rotor 17a = 18 poles - Rotor 17b = 16 poles

| Slot | Layer 1 | Layer 2 |
|---|---|---|
| 1 | −3 | 1 |
| 2 | 2 | 2 |

TABLE VII-continued

Stator winding 20 = 35 slots  
Rotor 17a = 18 poles - Rotor 17b = 16 poles

| Slot | Layer 1 | Layer 2 |
|---|---|---|
| 3 | −1 | −1 |
| 4 | −2 | −2 |
| 5 | 1 | 1 |
| 6 | 2 | 2 |
| 7 | −1 | −1 |
| 8 | −2 | 5 |
| 9 | 1 | 1 |
| 10 | −5 | −5 |
| 11 | −1 | −1 |
| 12 | 5 | 5 |
| 13 | 1 | 1 |
| 14 | −5 | −5 |
| 15 | −1 | 4 |
| 16 | 5 | 5 |
| 17 | −4 | −4 |
| 18 | −5 | −5 |
| 19 | 4 | 4 |
| 20 | 5 | 5 |
| 21 | −4 | −4 |
| 22 | −5 | 3 |
| 23 | 4 | 4 |
| 24 | −3 | −3 |
| 25 | −4 | −4 |
| 26 | 3 | 3 |
| 27 | 4 | 4 |
| 28 | −3 | −3 |
| 29 | −4 | 2 |
| 30 | 3 | 3 |
| 31 | −2 | −2 |
| 32 | −3 | −3 |
| 33 | 2 | 2 |
| 34 | 3 | 3 |
| 35 | −2 | −2 |

TABLE VIII

Stator winding 20 = 35 slots  
Rotor 17a = 32 poles - Rotor 17b = 26 poles

| Slot | Layer 1 | Layer 2 |
|---|---|---|
| 1 | 1 | 1 |
| 2 | −1 | 3 |
| 3 | −3 | −3 |
| 4 | 3 | −5 |
| 5 | 5 | 5 |
| 6 | −5 | 2 |
| 7 | −2 | −2 |
| 8 | 2 | 2 |
| 9 | −2 | 4 |
| 10 | −4 | −4 |
| 11 | 4 | −1 |
| 12 | 1 | 1 |
| 13 | −1 | 3 |
| 14 | −3 | −3 |
| 15 | 3 | 3 |
| 16 | −3 | 5 |
| 17 | −5 | −5 |
| 18 | 5 | −2 |
| 19 | 2 | 2 |
| 20 | −2 | 4 |
| 21 | −4 | −4 |
| 22 | 4 | 4 |
| 23 | −4 | 1 |
| 24 | −1 | −1 |
| 25 | 1 | −3 |
| 26 | 3 | 3 |
| 27 | −3 | 5 |
| 28 | −5 | −5 |
| 29 | 5 | 5 |
| 30 | −5 | 2 |
| 31 | −2 | −2 |

TABLE VIII-continued

Stator winding 20 = 35 slots  
Rotor 17a = 32 poles - Rotor 17b = 26 poles

| Slot | Layer 1 | Layer 2 |
|---|---|---|
| 32 | 2 | −4 |
| 33 | 4 | 4 |
| 34 | −4 | 1 |
| 35 | −1 | −1 |

TABLE IX

Stator winding 20 = 40 slots  
Rotor 17a = 14 poles - Rotor 17b = 38 poles

| Slot | Layer 1 | Layer 2 |
|---|---|---|
| 1 | −3 | 1 |
| 2 | −4 | −4 |
| 3 | −5 | −5 |
| 4 | −1 | −1 |
| 5 | 4 | −2 |
| 6 | 5 | 5 |
| 7 | 1 | 1 |
| 8 | 2 | 2 |
| 9 | −5 | 3 |
| 10 | −1 | −1 |
| 11 | −2 | −2 |
| 12 | −3 | −3 |
| 13 | 1 | −4 |
| 14 | 2 | 2 |
| 15 | 3 | 3 |
| 16 | 4 | 4 |
| 17 | −2 | 5 |
| 18 | −3 | −3 |
| 19 | −4 | −4 |
| 20 | −5 | −5 |
| 21 | 3 | −1 |
| 22 | 4 | 4 |
| 23 | 5 | 5 |
| 24 | 1 | 1 |
| 25 | −4 | 2 |
| 26 | −5 | −5 |
| 27 | −1 | −1 |
| 28 | −2 | −2 |
| 29 | 5 | −3 |
| 30 | 1 | 1 |
| 31 | 2 | 2 |
| 32 | 3 | 3 |
| 33 | −1 | 4 |
| 34 | −2 | −2 |
| 35 | −3 | −3 |
| 36 | −4 | −4 |
| 37 | 2 | −5 |
| 38 | 3 | 3 |
| 39 | 4 | 4 |
| 40 | 5 | 5 |

TABLE X

Stator winding 20 = 40 slots  
Rotor 17a = 18 poles - Rotor 17b = 26 poles

| Slot | Layer 1 | Layer 2 |
|---|---|---|
| 1 | 1 | 1 |
| 2 | 2 | 2 |
| 3 | −1 | 3 |
| 4 | −2 | 4 |
| 5 | −3 | −3 |
| 6 | −4 | −4 |
| 7 | 3 | −5 |
| 8 | 4 | −1 |
| 9 | 5 | 5 |
| 10 | 1 | 1 |

TABLE X-continued

Stator winding 20 = 40 slots
Rotor 17a = 18 poles - Rotor 17b = 26 poles

| Slot | Layer 1 | Layer 2 |
| --- | --- | --- |
| 11 | −5 | 2 |
| 12 | −1 | 3 |
| 13 | −2 | −2 |
| 14 | −3 | −3 |
| 15 | 2 | −4 |
| 16 | 3 | −5 |
| 17 | 4 | 4 |
| 18 | 5 | 5 |
| 19 | −4 | 1 |
| 20 | −5 | 2 |
| 21 | −1 | −1 |
| 22 | −2 | −2 |
| 23 | 1 | −3 |
| 24 | 2 | −4 |
| 25 | 3 | 3 |
| 26 | 4 | 4 |
| 27 | −3 | 5 |
| 28 | −4 | 1 |
| 29 | −5 | −5 |
| 30 | −1 | −1 |
| 31 | 5 | −2 |
| 32 | 1 | −3 |
| 33 | 2 | 2 |
| 34 | 3 | 3 |
| 35 | −2 | 4 |
| 36 | −3 | 5 |
| 37 | −4 | −4 |
| 38 | −5 | −5 |
| 39 | 4 | −1 |
| 40 | 5 | −2 |

TABLE XI

Stator winding 20 = 45 slots
Rotor 17a = 22 poles - Rotor 17b = 24 poles

| Slot | Layer 1 | Layer 2 |
| --- | --- | --- |
| 1 | 1 | 1 |
| 2 | 2 | 2 |
| 3 | −1 | 3 |
| 4 | −2 | −2 |
| 5 | −3 | −3 |
| 6 | 2 | 2 |
| 7 | 3 | 3 |
| 8 | −2 | −2 |
| 9 | −3 | −3 |
| 10 | 2 | 2 |
| 11 | 3 | 3 |
| 12 | −2 | 4 |
| 13 | −3 | −3 |
| 14 | −4 | −4 |
| 15 | 3 | 3 |
| 16 | 4 | 4 |
| 17 | −3 | −3 |
| 18 | −4 | −4 |
| 19 | 3 | 3 |
| 20 | 4 | 4 |
| 21 | −3 | 5 |
| 22 | −4 | −4 |
| 23 | −5 | −5 |
| 24 | 4 | 4 |
| 25 | 5 | 5 |
| 26 | −4 | −4 |
| 27 | −5 | −5 |
| 28 | 4 | 4 |
| 29 | 5 | 5 |
| 30 | −4 | 1 |
| 31 | −5 | −5 |
| 32 | −1 | −1 |
| 33 | 5 | 5 |
| 34 | 1 | 1 |

TABLE XI-continued

Stator winding 20 = 45 slots
Rotor 17a = 22 poles - Rotor 17b = 24 poles

| Slot | Layer 1 | Layer 2 |
| --- | --- | --- |
| 35 | −5 | −5 |
| 36 | −1 | −1 |
| 37 | 5 | 5 |
| 38 | 1 | 1 |
| 39 | −5 | 2 |
| 40 | −1 | −1 |
| 41 | −2 | −2 |
| 42 | 1 | 1 |
| 43 | 2 | 2 |
| 44 | −1 | −1 |
| 45 | −2 | −2 |

TABLE XII

Stator winding 20 = 45 slots
Rotor 17a = 22 poles - Rotor 17b = 18 poles

| Slot | Layer 1 | Layer 2 |
| --- | --- | --- |
| 1 | −3 | 1 |
| 2 | 2 | 2 |
| 3 | −1 | −1 |
| 4 | −2 | 5 |
| 5 | 1 | 1 |
| 6 | −5 | −5 |
| 7 | −1 | 4 |
| 8 | 5 | 5 |
| 9 | −4 | −4 |
| 10 | −5 | 3 |
| 11 | 4 | 4 |
| 12 | −3 | −3 |
| 13 | −4 | 2 |
| 14 | 3 | 3 |
| 15 | −2 | −2 |
| 16 | −3 | 1 |
| 17 | 2 | 2 |
| 18 | −1 | −1 |
| 19 | −2 | 5 |
| 20 | 1 | 1 |
| 21 | −5 | −5 |
| 22 | −1 | 4 |
| 23 | 5 | 5 |
| 24 | −4 | −4 |
| 25 | −5 | 3 |
| 26 | 4 | 4 |
| 27 | −3 | −3 |
| 28 | −4 | 2 |
| 29 | 3 | 3 |
| 30 | −2 | −2 |
| 31 | −3 | 1 |
| 32 | 2 | 2 |
| 33 | −1 | −1 |
| 34 | −2 | 5 |
| 35 | 1 | 1 |
| 36 | −5 | −5 |
| 37 | −1 | 4 |
| 38 | 5 | 5 |
| 39 | −4 | −4 |
| 40 | −5 | 3 |
| 41 | 4 | 4 |
| 42 | −3 | −3 |
| 43 | −4 | 2 |
| 44 | 3 | 3 |
| 45 | −2 | −2 |

TABLE XIII

Stator winding 20 = 45 slots
Rotor 17a = 38 poles - Rotor 17b = 24 poles

| Slot | Layer 1 | Layer 2 |
|---|---|---|
| 1 | 1 | 1 |
| 2 | −1 | 3 |
| 3 | −3 | 5 |
| 4 | −5 | 2 |
| 5 | −2 | 4 |
| 6 | −4 | −4 |
| 7 | 4 | −1 |
| 8 | 1 | −3 |
| 9 | 3 | −5 |
| 10 | 5 | 5 |
| 11 | −5 | 2 |
| 12 | −2 | 4 |
| 13 | −4 | 1 |
| 14 | −1 | 3 |
| 15 | −3 | −3 |
| 16 | 3 | −5 |
| 17 | 5 | −2 |
| 18 | 2 | −4 |
| 19 | 4 | 4 |
| 20 | −4 | 1 |
| 21 | −1 | 3 |
| 22 | −3 | 5 |
| 23 | −5 | 2 |
| 24 | −2 | −2 |
| 25 | 2 | −4 |
| 26 | 4 | −1 |
| 27 | 1 | −3 |
| 28 | 3 | 3 |
| 29 | −3 | 5 |
| 30 | −5 | 2 |
| 31 | −2 | 4 |
| 32 | −4 | 1 |
| 33 | −1 | −1 |
| 34 | 1 | −3 |
| 35 | 3 | −5 |
| 36 | 5 | −2 |
| 37 | 2 | 2 |
| 38 | −2 | 4 |
| 39 | −4 | 1 |
| 40 | −1 | 3 |
| 41 | −3 | 5 |
| 42 | −5 | −5 |
| 43 | 5 | −2 |
| 44 | 2 | −4 |
| 45 | 4 | −1 |

TABLE XIV

Stator winding 20 = 45 slots
Rotor 17a = 42 poles - Rotor 17b = 36 poles

| Slot | Layer 1 | Layer 2 |
|---|---|---|
| 1 | 1 | 1 |
| 2 | −1 | 3 |
| 3 | −3 | −3 |
| 4 | 3 | 3 |
| 5 | −3 | 5 |
| 6 | −5 | −5 |
| 7 | 5 | 5 |
| 8 | −5 | 2 |
| 9 | −2 | −2 |
| 10 | 2 | 2 |
| 11 | −2 | 4 |
| 12 | −4 | −4 |
| 13 | 4 | 4 |
| 14 | −4 | 1 |
| 15 | −1 | −1 |
| 16 | 1 | 1 |
| 17 | −1 | 3 |
| 18 | −3 | −3 |
| 19 | 3 | 3 |
| 20 | −3 | 5 |
| 21 | −5 | −5 |
| 22 | 5 | 5 |
| 23 | −5 | 2 |
| 24 | −2 | −2 |
| 25 | 2 | 2 |
| 26 | −2 | 4 |
| 27 | −4 | −4 |
| 28 | 4 | 4 |
| 29 | −4 | 1 |
| 30 | −1 | −1 |
| 31 | 1 | 1 |
| 32 | −1 | 3 |
| 33 | −3 | −3 |
| 34 | 3 | 3 |
| 35 | −3 | 5 |
| 36 | −5 | −5 |
| 37 | 5 | 5 |
| 38 | −5 | 2 |
| 39 | −2 | −2 |
| 40 | 2 | 2 |
| 41 | −2 | 4 |
| 42 | −4 | −4 |
| 43 | 4 | 4 |
| 44 | −4 | 1 |
| 45 | −1 | −1 |

TABLE XV

Stator winding 20 = 45 slots
Rotor 17a = 46 poles - Rotor 17b = 24 poles

| Slot | Layer 1 | Layer 2 |
|---|---|---|
| 1 | −3 | 1 |
| 2 | −1 | −1 |
| 3 | 1 | 1 |
| 4 | −1 | −1 |
| 5 | 1 | 1 |
| 6 | −1 | −1 |
| 7 | 1 | 1 |
| 8 | −1 | −1 |
| 9 | 1 | 1 |
| 10 | −1 | 4 |
| 11 | −4 | −4 |
| 12 | 4 | 4 |
| 13 | −4 | −4 |
| 14 | 4 | 4 |
| 15 | −4 | −4 |
| 16 | 4 | 4 |
| 17 | −4 | −4 |
| 18 | 4 | 4 |
| 19 | −4 | 2 |
| 20 | −2 | −2 |
| 21 | 2 | 2 |
| 22 | −2 | −2 |
| 23 | 2 | 2 |
| 24 | −2 | −2 |
| 25 | 2 | 2 |
| 26 | −2 | −2 |
| 27 | 2 | 2 |
| 28 | −2 | 5 |
| 29 | −5 | −5 |
| 30 | 5 | 5 |
| 31 | −5 | −5 |
| 32 | 5 | 5 |
| 33 | −5 | −5 |
| 34 | 5 | 5 |
| 35 | −5 | −5 |

TABLE XV-continued

Stator winding 20 = 45 slots
Rotor 17a = 46 poles - Rotor 17b = 24 poles

| Slot | Layer 1 | Layer 2 |
|---|---|---|
| 36 | 5 | 5 |
| 37 | −5 | 3 |
| 38 | −3 | −3 |
| 39 | 3 | 3 |
| 40 | −3 | −3 |
| 41 | 3 | 3 |
| 42 | −3 | −3 |
| 43 | 3 | 3 |
| 44 | −3 | −3 |
| 45 | 3 | 3 |

TABLE XVI

Stator winding 20 = 50 slots
Rotor 17a = 22 poles - Rotor 17b = 34 poles

| Slot | Layer 1 | Layer 2 |
|---|---|---|
| 1 | 1 | 1 |
| 2 | 2 | 2 |
| 3 | −1 | 3 |
| 4 | −2 | 4 |
| 5 | −3 | 5 |
| 6 | −4 | −4 |
| 7 | −5 | −5 |
| 8 | 4 | −1 |
| 9 | 5 | −2 |
| 10 | 1 | −3 |
| 11 | 2 | 2 |
| 12 | 3 | 3 |
| 13 | −2 | 4 |
| 14 | −3 | 5 |
| 15 | −4 | 1 |
| 16 | −5 | −5 |
| 17 | −1 | −1 |
| 18 | 5 | −2 |
| 19 | 1 | −3 |
| 20 | 2 | −4 |
| 21 | 3 | 3 |
| 22 | 4 | 4 |
| 23 | −3 | 5 |
| 24 | −4 | 1 |
| 25 | −5 | 2 |
| 26 | −1 | −1 |
| 27 | −2 | −2 |
| 28 | 1 | −3 |
| 29 | 2 | −4 |
| 30 | 3 | −5 |
| 31 | 4 | 4 |
| 32 | 5 | 5 |
| 33 | −4 | 1 |
| 34 | −5 | 2 |
| 35 | −1 | 3 |
| 36 | −2 | −2 |
| 37 | −3 | −3 |
| 38 | 2 | −4 |
| 39 | 3 | −5 |
| 40 | 4 | −1 |
| 41 | 5 | 5 |
| 42 | 1 | 1 |
| 43 | −5 | 2 |
| 44 | −1 | 3 |
| 45 | −2 | 4 |
| 46 | −3 | −3 |
| 47 | −4 | −4 |
| 48 | 3 | −5 |
| 49 | 4 | −1 |
| 50 | 5 | −2 |

TABLE XVII

Stator winding 20 = 50 slots
Rotor 17a = 24 poles - Rotor 17b = 28 poles

| Slot | Layer 1 | Layer 2 |
|---|---|---|
| 1 | 1 | 1 |
| 2 | 2 | 2 |
| 3 | −1 | 3 |
| 4 | −2 | −2 |
| 5 | −3 | −3 |
| 6 | 2 | 2 |
| 7 | 3 | 3 |
| 8 | −2 | 4 |
| 9 | −3 | −3 |
| 10 | −4 | −4 |
| 11 | 3 | 3 |
| 12 | 4 | 4 |
| 13 | −3 | 5 |
| 14 | −4 | −4 |
| 15 | −5 | −5 |
| 16 | 4 | 4 |
| 17 | 5 | 5 |
| 18 | −4 | 1 |
| 19 | −5 | −5 |
| 20 | −1 | −1 |
| 21 | 5 | 5 |
| 22 | 1 | 1 |
| 23 | −5 | 2 |
| 24 | −1 | −1 |
| 25 | −2 | −2 |
| 26 | 1 | 1 |
| 27 | 2 | 2 |
| 28 | −1 | 3 |
| 29 | −2 | −2 |
| 30 | −3 | −3 |
| 31 | 2 | 2 |
| 32 | 3 | 3 |
| 33 | −2 | 4 |
| 34 | −3 | −3 |
| 35 | −4 | −4 |
| 36 | 3 | 3 |
| 37 | 4 | 4 |
| 38 | −3 | 5 |
| 39 | −4 | −4 |
| 40 | −5 | −5 |
| 41 | 4 | 4 |
| 42 | 5 | 5 |
| 43 | −4 | 1 |
| 44 | −5 | −5 |
| 45 | −1 | −1 |
| 46 | 5 | 5 |
| 47 | 1 | 1 |
| 48 | −5 | 2 |
| 49 | −1 | −1 |
| 50 | −2 | −2 |

TABLE XVIII

Stator winding 20 = 50 slots
Rotor 17a = 26 poles - Rotor 17b = 22 poles

| Slot | Layer 1 | Layer 2 |
|---|---|---|
| 1 | 1 | 1 |
| 2 | 2 | 2 |
| 3 | −1 | −1 |
| 4 | −2 | −2 |
| 5 | 1 | 1 |
| 6 | 2 | −5 |
| 7 | −1 | −1 |
| 8 | 5 | 5 |
| 9 | 1 | 1 |
| 10 | −5 | −5 |
| 11 | −1 | 4 |
| 12 | 5 | 5 |
| 13 | −4 | −4 |
| 14 | −5 | −5 |

TABLE XVIII-continued

Stator winding 20 = 50 slots  
Rotor 17a = 26 poles - Rotor 17b = 22 poles

| Slot | Layer 1 | Layer 2 |
|---|---|---|
| 15 | 4 | 4 |
| 16 | 5 | −3 |
| 17 | −4 | −4 |
| 18 | 3 | 3 |
| 19 | 4 | 4 |
| 20 | −3 | −3 |
| 21 | −4 | 2 |
| 22 | 3 | 3 |
| 23 | −2 | −2 |
| 24 | −3 | −3 |
| 25 | 2 | 2 |
| 26 | 3 | −1 |
| 27 | −2 | −2 |
| 28 | 1 | 1 |
| 29 | 2 | 2 |
| 30 | −1 | −1 |
| 31 | −2 | 5 |
| 32 | 1 | 1 |
| 33 | −5 | −5 |
| 34 | −1 | −1 |
| 35 | 5 | 5 |
| 36 | 1 | −4 |
| 37 | −5 | −5 |
| 38 | 4 | 4 |
| 39 | 5 | 5 |
| 40 | −4 | −4 |
| 41 | −5 | 3 |
| 42 | 4 | 4 |
| 43 | −3 | −3 |
| 44 | −4 | −4 |
| 45 | 3 | 3 |
| 46 | 4 | −2 |
| 47 | −3 | −3 |
| 48 | 2 | 2 |
| 49 | 3 | 3 |
| 50 | −2 | −2 |

TABLE XIX

Stator winding 20 = 50 slots  
Rotor 17a = 42 poles - Rotor 17b = 26 poles

| Slot | Layer 1 | Layer 2 |
|---|---|---|
| 1 | 1 | 1 |
| 2 | −1 | 3 |
| 3 | −3 | 5 |
| 4 | −5 | 2 |
| 5 | −2 | 4 |
| 6 | −4 | −4 |
| 7 | 4 | −1 |
| 8 | 1 | −3 |
| 9 | 3 | −5 |
| 10 | 5 | −2 |
| 11 | 2 | 2 |
| 12 | −2 | 4 |
| 13 | −4 | 1 |
| 14 | −1 | 3 |
| 15 | −3 | 5 |
| 16 | −5 | −5 |
| 17 | 5 | −2 |
| 18 | 2 | −4 |
| 19 | 4 | −1 |
| 20 | 1 | −3 |
| 21 | 3 | 3 |
| 22 | −3 | 5 |
| 23 | −5 | 2 |
| 24 | −2 | 4 |
| 25 | −4 | 1 |
| 26 | −1 | −1 |
| 27 | 1 | −3 |
| 28 | 3 | −5 |

TABLE XIX-continued

Stator winding 20 = 50 slots  
Rotor 17a = 42 poles - Rotor 17b = 26 poles

| Slot | Layer 1 | Layer 2 |
|---|---|---|
| 29 | 5 | −2 |
| 30 | 2 | −4 |
| 31 | 4 | 4 |
| 32 | −4 | 1 |
| 33 | −1 | 3 |
| 34 | −3 | 5 |
| 35 | −5 | 2 |
| 36 | −2 | −2 |
| 37 | 2 | −4 |
| 38 | 4 | −1 |
| 39 | 1 | −3 |
| 40 | 3 | −5 |
| 41 | 5 | 5 |
| 42 | −5 | 2 |
| 43 | −2 | 4 |
| 44 | −4 | 1 |
| 45 | −1 | 3 |
| 46 | −3 | −3 |
| 47 | 3 | −5 |
| 48 | 5 | −2 |
| 49 | 2 | −4 |
| 50 | 4 | −1 |

TABLE XX

Stator winding 20 = 50 slots  
Rotor 17a = 44 poles - Rotor 17b = 32 poles

| Slot | Layer 1 | Layer 2 |
|---|---|---|
| 1 | 4 | 1 |
| 2 | −1 | 3 |
| 3 | −3 | 5 |
| 4 | −5 | −5 |
| 5 | 5 | −2 |
| 6 | 2 | 2 |
| 7 | −2 | 4 |
| 8 | −4 | 1 |
| 9 | −1 | −1 |
| 10 | 1 | −3 |
| 11 | 3 | 3 |
| 12 | −3 | 5 |
| 13 | −5 | 2 |
| 14 | −2 | −2 |
| 15 | 2 | −4 |
| 16 | 4 | 4 |
| 17 | −4 | 1 |
| 18 | −1 | 3 |
| 19 | −3 | −3 |
| 20 | 3 | −5 |
| 21 | 5 | 5 |
| 22 | −5 | 2 |
| 23 | −2 | 4 |
| 24 | −4 | −4 |
| 25 | 4 | −1 |
| 26 | 1 | 1 |
| 27 | −1 | 3 |
| 28 | −3 | 5 |
| 29 | −5 | −5 |
| 30 | 5 | −2 |
| 31 | 2 | 2 |
| 32 | −2 | 4 |
| 33 | −4 | 1 |
| 34 | −1 | −1 |
| 35 | 1 | −3 |
| 36 | 3 | 3 |
| 37 | −3 | 5 |
| 38 | −5 | 2 |
| 39 | −2 | −2 |
| 40 | 2 | −4 |
| 41 | 4 | 4 |
| 42 | −4 | 1 |

TABLE XX-continued

Stator winding 20 = 50 slots
Rotor 17a = 44 poles - Rotor 17b = 32 poles

| Slot | Layer 1 | Layer 2 |
|---|---|---|
| 43 | −1 | 3 |
| 44 | −3 | −3 |
| 45 | 3 | −5 |
| 46 | 5 | 5 |
| 47 | −5 | 2 |
| 48 | −2 | 4 |
| 49 | −4 | −4 |
| 50 | 4 | −1 |

TABLE XXI

Stator winding 20 = 50 slots
Rotor 17a = 46 poles - Rotor 17b = 38 poles

| Slot | Layer 1 | Layer 2 |
|---|---|---|
| 1 | 1 | 1 |
| 2 | −1 | 3 |
| 3 | −3 | −3 |
| 4 | 3 | −5 |
| 5 | 5 | 5 |
| 6 | −5 | −5 |
| 7 | 5 | −2 |
| 8 | 2 | 2 |
| 9 | −2 | 4 |
| 10 | −4 | −4 |
| 11 | 4 | 4 |
| 12 | −4 | 1 |
| 13 | −1 | −1 |
| 14 | 1 | −3 |
| 15 | 3 | 3 |
| 16 | −3 | −3 |
| 17 | 3 | −5 |
| 18 | 5 | 5 |
| 19 | −5 | 2 |
| 20 | −2 | −2 |
| 21 | 2 | 2 |
| 22 | −2 | 4 |
| 23 | −4 | −4 |
| 24 | 4 | −1 |
| 25 | 1 | 1 |
| 26 | −1 | −1 |
| 27 | 1 | −3 |
| 28 | 3 | 3 |
| 29 | −3 | 5 |
| 30 | −5 | −5 |
| 31 | 5 | 5 |
| 32 | −5 | 2 |
| 33 | −2 | −2 |
| 34 | 2 | −4 |
| 35 | 4 | 4 |
| 36 | −4 | −4 |
| 37 | 4 | −1 |
| 38 | 1 | 1 |
| 39 | −1 | 3 |
| 40 | −3 | −3 |
| 41 | 3 | 3 |
| 42 | −3 | 5 |
| 43 | −5 | −5 |
| 44 | 5 | −2 |
| 45 | 2 | 2 |
| 46 | −2 | −2 |
| 47 | 2 | −4 |
| 48 | 4 | 4 |
| 49 | −4 | 1 |
| 50 | −1 | −1 |

TABLE XXII

Stator winding 20 = 50 slots
Rotor 17a = 48 poles - Rotor 17b = 44 poles

| Slot | Layer 1 | Layer 2 |
|---|---|---|
| 1 | 1 | 1 |
| 2 | −1 | 3 |
| 3 | −3 | −3 |
| 4 | 3 | 3 |
| 5 | −3 | −3 |
| 6 | 3 | 3 |
| 7 | −3 | 5 |
| 8 | −5 | −5 |
| 9 | 5 | 5 |
| 10 | −5 | −5 |
| 11 | 5 | 5 |
| 12 | −5 | 2 |
| 13 | −2 | −2 |
| 14 | 2 | 2 |
| 15 | −2 | −2 |
| 16 | 2 | 2 |
| 17 | −2 | 4 |
| 18 | −4 | −4 |
| 19 | 4 | 4 |
| 20 | −4 | −4 |
| 21 | 4 | 4 |
| 22 | −4 | 1 |
| 23 | −1 | −1 |
| 24 | 1 | 1 |
| 25 | −1 | −1 |
| 26 | 1 | 1 |
| 27 | −1 | 3 |
| 28 | −3 | −3 |
| 29 | 3 | 3 |
| 30 | −3 | −3 |
| 31 | 3 | 3 |
| 32 | −3 | 5 |
| 33 | −5 | −5 |
| 34 | 5 | 5 |
| 35 | −5 | −5 |
| 36 | 5 | 5 |
| 37 | −5 | 2 |
| 38 | −2 | −2 |
| 39 | 2 | 2 |
| 40 | −2 | −2 |
| 41 | 2 | 2 |
| 42 | −2 | 4 |
| 43 | −4 | −4 |
| 44 | 4 | 4 |
| 45 | −4 | −4 |
| 46 | 4 | 4 |
| 47 | −4 | 1 |
| 48 | −1 | −1 |
| 49 | 1 | 1 |
| 50 | −1 | −1 |

TABLE XXIII

Stator winding 20 = 50 slots
Rotor 17a = 52 poles - Rotor 17b = 44 poles

| Slot | Layer 1 | Layer 2 |
|---|---|---|
| 1 | −3 | 1 |
| 2 | −1 | −1 |
| 3 | 1 | 1 |
| 4 | −1 | −1 |
| 5 | 1 | 1 |
| 6 | −1 | 4 |
| 7 | −4 | −4 |
| 8 | 4 | 4 |
| 9 | −4 | −4 |
| 10 | 4 | 4 |
| 11 | −4 | 2 |
| 12 | −2 | −2 |
| 13 | 2 | 2 |
| 14 | −2 | −2 |

TABLE XXIII-continued

Stator winding 20 = 50 slots  
Rotor 17a = 52 poles - Rotor 17b = 44 poles

| Slot | Layer 1 | Layer 2 |
|---|---|---|
| 15 | 2 | 2 |
| 16 | −2 | 5 |
| 17 | −5 | −5 |
| 18 | 5 | 5 |
| 19 | −5 | −5 |
| 20 | 5 | 5 |
| 21 | −5 | 3 |
| 22 | −3 | −3 |
| 23 | 3 | 3 |
| 24 | −3 | −3 |
| 25 | 3 | 3 |
| 26 | −3 | 1 |
| 27 | −1 | −1 |
| 28 | 1 | 1 |
| 29 | −1 | −1 |
| 30 | 1 | 1 |
| 31 | −1 | 4 |
| 32 | −4 | −4 |
| 33 | 4 | 4 |
| 34 | −4 | −4 |
| 35 | 4 | 4 |
| 36 | −4 | 2 |
| 37 | −2 | −2 |
| 38 | 2 | 2 |
| 39 | −2 | −2 |
| 40 | 2 | 2 |
| 41 | −2 | 5 |
| 42 | −5 | −5 |
| 43 | 5 | 5 |
| 44 | −5 | −5 |
| 45 | 5 | 5 |
| 46 | −5 | 3 |
| 47 | −3 | −3 |
| 48 | 3 | 3 |
| 49 | −3 | −3 |
| 50 | 3 | 3 |

TABLE XXIV

Stator winding 20 = 50 slots  
Rotor 17a = 54 poles - Rotor 17b = 38 poles

| Slot | Layer 1 | Layer 2 |
|---|---|---|
| 1 | −3 | 1 |
| 2 | −1 | −1 |
| 3 | 1 | 1 |
| 4 | −1 | 4 |
| 5 | −4 | −4 |
| 6 | 4 | −2 |
| 7 | 2 | 2 |
| 8 | −2 | −2 |
| 9 | 2 | −5 |
| 10 | 5 | 5 |
| 11 | −5 | 3 |
| 12 | −3 | −3 |
| 13 | 3 | 3 |
| 14 | −3 | 1 |
| 15 | −1 | −1 |
| 16 | 1 | −4 |
| 17 | 4 | 4 |
| 18 | −4 | −4 |
| 19 | 4 | −2 |
| 20 | 2 | 2 |
| 21 | −2 | 5 |
| 22 | −5 | −5 |
| 23 | 5 | 5 |
| 24 | −5 | 3 |
| 25 | −3 | −3 |
| 26 | 3 | −1 |
| 27 | 1 | 1 |
| 28 | −1 | −1 |

TABLE XXIV-continued

Stator winding 20 = 50 slots  
Rotor 17a = 54 poles - Rotor 17b = 38 poles

| Slot | Layer 1 | Layer 2 |
|---|---|---|
| 29 | 1 | −4 |
| 30 | 4 | 4 |
| 31 | −4 | 2 |
| 32 | −2 | −2 |
| 33 | 2 | 2 |
| 34 | −2 | 5 |
| 35 | −5 | −5 |
| 36 | 5 | −3 |
| 37 | 3 | 3 |
| 38 | −3 | −3 |
| 39 | 3 | −1 |
| 40 | 1 | 1 |
| 41 | −1 | 4 |
| 42 | −4 | −4 |
| 43 | 4 | 4 |
| 44 | −4 | 2 |
| 45 | −2 | −2 |
| 46 | 2 | −5 |
| 47 | 5 | 5 |
| 48 | −5 | −5 |
| 49 | 5 | −3 |
| 50 | 3 | 3 |

TABLE XXV

Stator winding 20 = 50 slots  
Rotor 17a = 56 poles - Rotor 17b = 32 poles

| Slot | Layer 1 | Layer 2 |
|---|---|---|
| 1 | −3 | 1 |
| 2 | −1 | −1 |
| 3 | 1 | −4 |
| 4 | 4 | 4 |
| 5 | −4 | 2 |
| 6 | −2 | 5 |
| 7 | −5 | −5 |
| 8 | 5 | −3 |
| 9 | 3 | 3 |
| 10 | −3 | 1 |
| 11 | −1 | 4 |
| 12 | −4 | −4 |
| 13 | 4 | −2 |
| 14 | 2 | 2 |
| 15 | −2 | 5 |
| 16 | −5 | 3 |
| 17 | −3 | −3 |
| 18 | 3 | −1 |
| 19 | 1 | 1 |
| 20 | −1 | 4 |
| 21 | −4 | 2 |
| 22 | −2 | −2 |
| 23 | 2 | −5 |
| 24 | 5 | 5 |
| 25 | −5 | 3 |
| 26 | −3 | 1 |
| 27 | −1 | −1 |
| 28 | 1 | −4 |
| 29 | 4 | 4 |
| 30 | −4 | 2 |
| 31 | −2 | 5 |
| 32 | −5 | −5 |
| 33 | 5 | −3 |
| 34 | 3 | 3 |
| 35 | −3 | 1 |
| 36 | −1 | 4 |
| 37 | −4 | −4 |
| 38 | 4 | −2 |
| 39 | 2 | 2 |
| 40 | −2 | 5 |
| 41 | −5 | 3 |
| 42 | −3 | −3 |

TABLE XXV-continued

Stator winding 20 = 50 slots
Rotor 17a = 56 poles - Rotor 17b = 32 poles

| Slot | Layer 1 | Layer 2 |
|---|---|---|
| 43 | 3 | −1 |
| 44 | 1 | 1 |
| 45 | −1 | 4 |
| 46 | −4 | 2 |
| 47 | −2 | −2 |
| 48 | 2 | −5 |
| 49 | 5 | 5 |
| 50 | −5 | 3 |

TABLE XXVI

Stator winding 20 = 50 slots
Rotor 17a = 58 poles - Rotor 17b = 26 poles

| Slot | Layer 1 | Layer 2 |
|---|---|---|
| 1 | −3 | 1 |
| 2 | −1 | −1 |
| 3 | 1 | −4 |
| 4 | 4 | −2 |
| 5 | 2 | −5 |
| 6 | 5 | −3 |
| 7 | 3 | 3 |
| 8 | −3 | 1 |
| 9 | −1 | 4 |
| 10 | −4 | 2 |
| 11 | −2 | 5 |
| 12 | −5 | −5 |
| 13 | 5 | −3 |
| 14 | 3 | −1 |
| 15 | 1 | −4 |
| 16 | 4 | −2 |
| 17 | 2 | 2 |
| 18 | −2 | 5 |
| 19 | −5 | 3 |
| 20 | −3 | 1 |
| 21 | −1 | 4 |
| 22 | −4 | −4 |
| 23 | 4 | −2 |
| 24 | 2 | −5 |
| 25 | 5 | −3 |
| 26 | 3 | −1 |
| 27 | 1 | 1 |
| 28 | −1 | 4 |
| 29 | −4 | 2 |
| 30 | −2 | 5 |
| 31 | −5 | 3 |
| 32 | −3 | −3 |
| 33 | 3 | −1 |
| 34 | 1 | −4 |
| 35 | 4 | −2 |
| 36 | 2 | −5 |
| 37 | 5 | 5 |
| 38 | −5 | 3 |
| 39 | −3 | 1 |
| 40 | −1 | 4 |
| 41 | −4 | 2 |
| 42 | −2 | −2 |
| 43 | 2 | −5 |
| 44 | 5 | −3 |
| 45 | 3 | −1 |
| 46 | 1 | −4 |
| 47 | 4 | 4 |
| 48 | −4 | 2 |
| 49 | −2 | 5 |
| 50 | −5 | 3 |

The invention claimed is:

1. An electric machine, comprising:
a stator provided with one single stator winding;
at least two shafts which are independent from one another and mounted rotating;
at least two rotors which are independent from one another, magnetically coupled to the stator and mounted on the shafts; a first rotor presents a first number of pole pairs and a second rotor presents a second number of pole pairs, which is different from the first number of pole pairs; and
a single electronic power converter which is connected to the stator winding in order to supply the stator winding itself through a total electric current;
the stator winding when it is crossed by a first system of sinusoidal electric currents generates a first rotating magnetic field presenting a very important harmonic of order equal to the first number of pole pairs and negligible harmonics of order equal to the second number of pole pairs or a multiple thereof, and when it is crossed by a second system of sinusoidal electric currents generates a second rotating magnetic field presenting a very important harmonic of order equal to the second number of pole pairs and negligible harmonics of order equal to the first number of pole pairs or a multiple thereof; and
the electronic power converter generates a total system of electric currents which flows through the stator winding and is made up by the union of a first system of sinusoidal electric currents generating a first rotating magnetic field presenting a very important harmonic of order equal to the first number of pole pairs and negligible harmonics of order equal to the second number of pole pairs or a multiple thereof and of a second system of sinusoidal electric currents generating a second rotating magnetic field presenting a very important harmonic of order equal to the second number of pole pairs and negligible harmonics of order equal to the first number of pole pairs or a multiple thereof;
wherein both rotors are provided with permanent magnets;
wherein the stator winding presents a fractional number of slots per pole and per phase with both rotors;
wherein the stator winding presents an odd number of phases which is equal to the double of the number of rotors added by one;
wherein the first system of sinusoidal electric currents and the second system of sinusoidal electric currents have the same number of phases which is equal to the number of phases of the stator winding; and
wherein the delay angle existing between the current of one phase and the current of the successive phase of the first system of sinusoidal electric currents is different from the delay angle existing between the current of one phase and the current of the successive phase of the second system of sinusoidal electric currents.

2. The electric machine according to claim 1, wherein the stator winding, when crossed by a sinusoidal current, generates a stationary magnetic field presenting two dominant harmonics which are much more important than the other harmonics.

3. The electric machine according to claim 2, wherein the two dominant harmonics of the stationary magnetic field are more or less similar.

4. The electric machine according to claim 2, wherein the harmonic orders of the two dominant harmonics of the stationary magnetic field are close to each other.

5. The electric machine according to claim 1, wherein the difference between the first number of pole pairs and the second number of pole pairs is integer and equal to one.

6. The electric machine according to claim 1 and comprising a control unit which determines the first five-phase system of sinusoidal electric currents exclusively according to the control requirements of the first rotor and determines the second five-phase system of sinusoidal electric currents exclusively according to the control requirements of the second rotor; the total system of electric currents flowing through the stator winding is the result of the addition of the first and the second five-phase system of sinusoidal electric currents.

7. The electric machine according to claim 1, wherein the two systems of sinusoidal electric currents differentiate from one another due to the different frequency.

8. The electric machine according to claim 7, wherein a frequency of the first system of sinusoidal electric currents is directly proportional to a velocity of rotation of the first rotor and a frequency of the second system of sinusoidal electric currents is directly proportional to a velocity of rotation of the second rotor.

9. The electric machine according to claim 1, wherein:
the stator presents a tubular cylindrical form and houses in its inside the two rotors which are coaxial to one another and placed one next to the other;
there is a separation element which presents a flat circular form, divides the stator into two parts, is located between the two rotors, is made with a magnetic material, and supports two bearings, each of which is coupled to a respective shaft.

10. The electric machine according to claim 1, wherein the stator winding is a five-phases stator winding, presents a number of slots not greater than fifty, and is disclosed in one of the attached tables I-XXVI.

11. The electric machine according to claim 1, wherein the pitch of the stator winding is close to the polar pitches of the rotors.

12. The electric machine according to claim 11, wherein the pitch of the stator winding is approximately centroidal between the polar pitches of the rotors.

13. A vehicle, comprising:
at least two driving wheels arranged on a same axle; and
at least one electric machine comprising a single stator, two shafts which are independent from one another, mounted rotating and integral to the two driving wheels, at least two rotors which are independent from one another, magnetically coupled to the stator and mounted on the shafts, and a single electronic power converter which is connected to the stator winding in order to supply the stator winding itself through a total electric current;
the at least one electric machine configured according to claim 1.

14. The vehicle according to claim 13, wherein the shafts of the electric machine also constitute the axle shafts of the driving wheels.

* * * * *